(12) United States Patent
Fukuda et al.

(10) Patent No.: US 7,839,603 B2
(45) Date of Patent: Nov. 23, 2010

(54) MAGNETIC HEAD DEVICE AND MAGNETIC RECORDING/REPRODUCING APPARATUS

(75) Inventors: Shinichi Fukuda, Kanagawa (JP); Hidetoshi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 945 days.

(21) Appl. No.: 11/708,291

(22) Filed: Feb. 20, 2007

(65) Prior Publication Data

US 2007/0242380 A1    Oct. 18, 2007

(51) Int. Cl.
*G11B 5/127* (2006.01)

(52) U.S. Cl. .................................................. 360/121

(58) Field of Classification Search .................. None
See application file for complete search history.

(56) References Cited

U.S. PATENT DOCUMENTS

| | | | | |
|---|---|---|---|---|
| 5,022,023 | A * | 6/1991 | Toyoguchi | 720/624 |
| 5,883,750 | A | 3/1999 | Maurice et al. | |
| 6,026,211 | A * | 2/2000 | Nakamura et al. | 386/46 |
| 2008/0068752 | A1* | 3/2008 | Biskeborn | 360/129 |
| 2008/0137235 | A1* | 6/2008 | Biskeborn et al. | 360/317 |

FOREIGN PATENT DOCUMENTS

| | | |
|---|---|---|
| JP | 52-128114 | 10/1977 |
| JP | 63-106909 | 10/1983 |
| JP | 58-220218 | 12/1983 |
| JP | 01-137421 | 5/1989 |
| JP | HEI 01-137421 | 5/1989 |
| JP | 02-042612 | 2/1990 |
| JP | 03-116403 | 5/1991 |
| JP | 03-116404 | 5/1991 |
| JP | 03-116405 | 5/1991 |
| JP | 04-206012 | 7/1992 |
| JP | HEI 04-206012 | 7/1992 |
| JP | 04-370580 | 12/1992 |
| JP | 05-020788 | 1/1993 |
| JP | 10-283620 | 10/1998 |
| JP | 2001-229416 | 8/2001 |
| JP | 2001-229516 | 8/2001 |
| JP | 2002-157710 | 5/2002 |
| JP | 2002-216313 | 8/2002 |
| JP | 3375339 | 11/2002 |
| JP | 2003-123214 | 4/2003 |
| JP | 2003-132504 | 5/2003 |
| JP | 2003-338012 | 11/2003 |
| JP | 2004-246949 | 9/2004 |
| JP | 2005-011456 | 1/2005 |
| JP | 2005-011546 | 1/2005 |
| JP | 2005-332451 | 12/2005 |

* cited by examiner

*Primary Examiner*—Allen T Cao
(74) *Attorney, Agent, or Firm*—Robert J. Depke; Rockey, Depke & Lyons, LLC

(57) ABSTRACT

A magnetic head device performs a recording operation and a reproducing operation in a linear magnetic tape recording system having a plurality of tracks that are formed parallel to each other in a longitudinal direction of a tape. The magnetic head device includes a recording head block including a plurality of recording heads that are disposed in correspondence with respective tracks in a first area including the tracks that are adjacent to each other. The magnetic head device performs the recording operation on the tracks that are adjacent to each other at the same time with the recording head block.

4 Claims, 15 Drawing Sheets

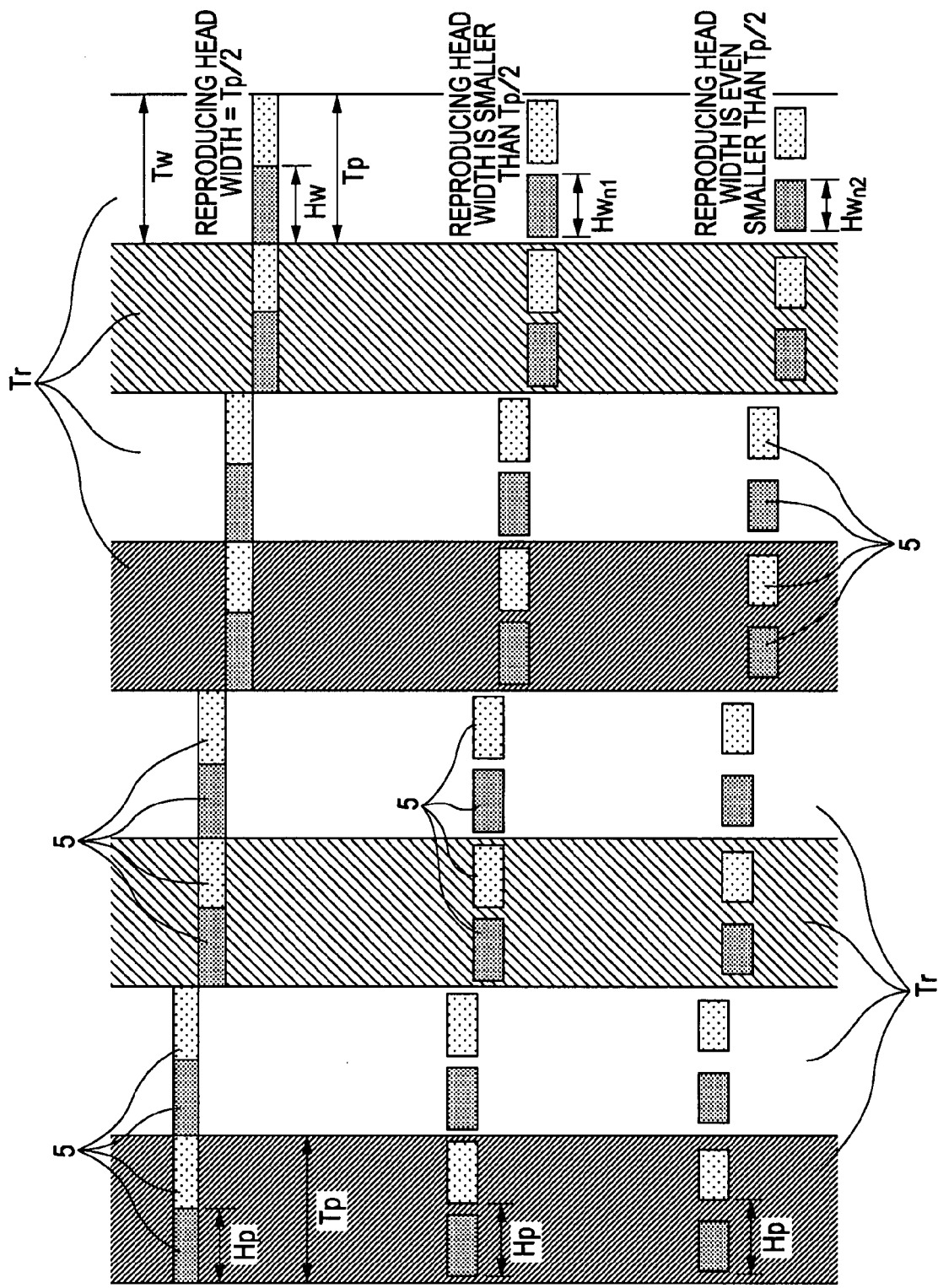

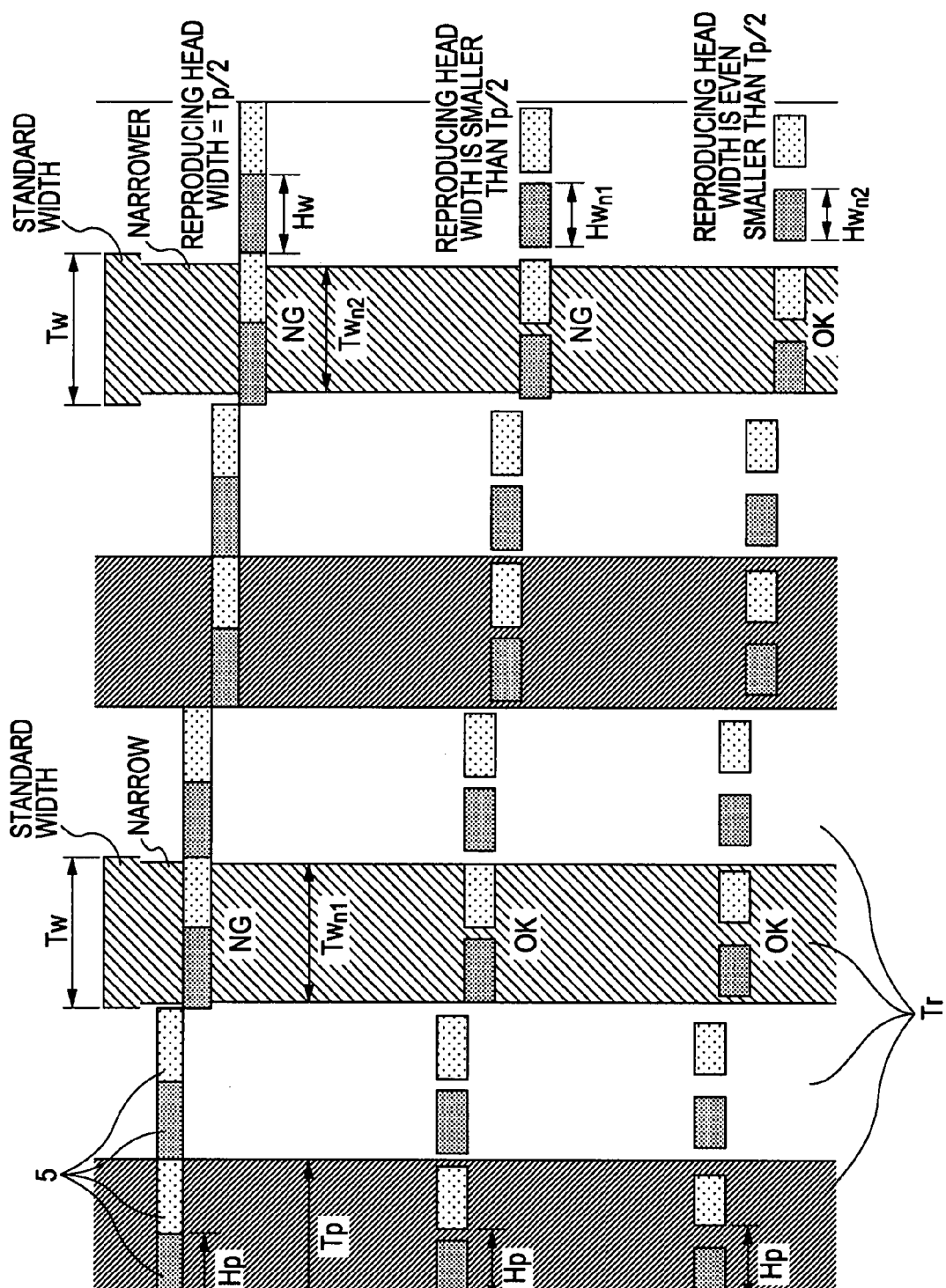

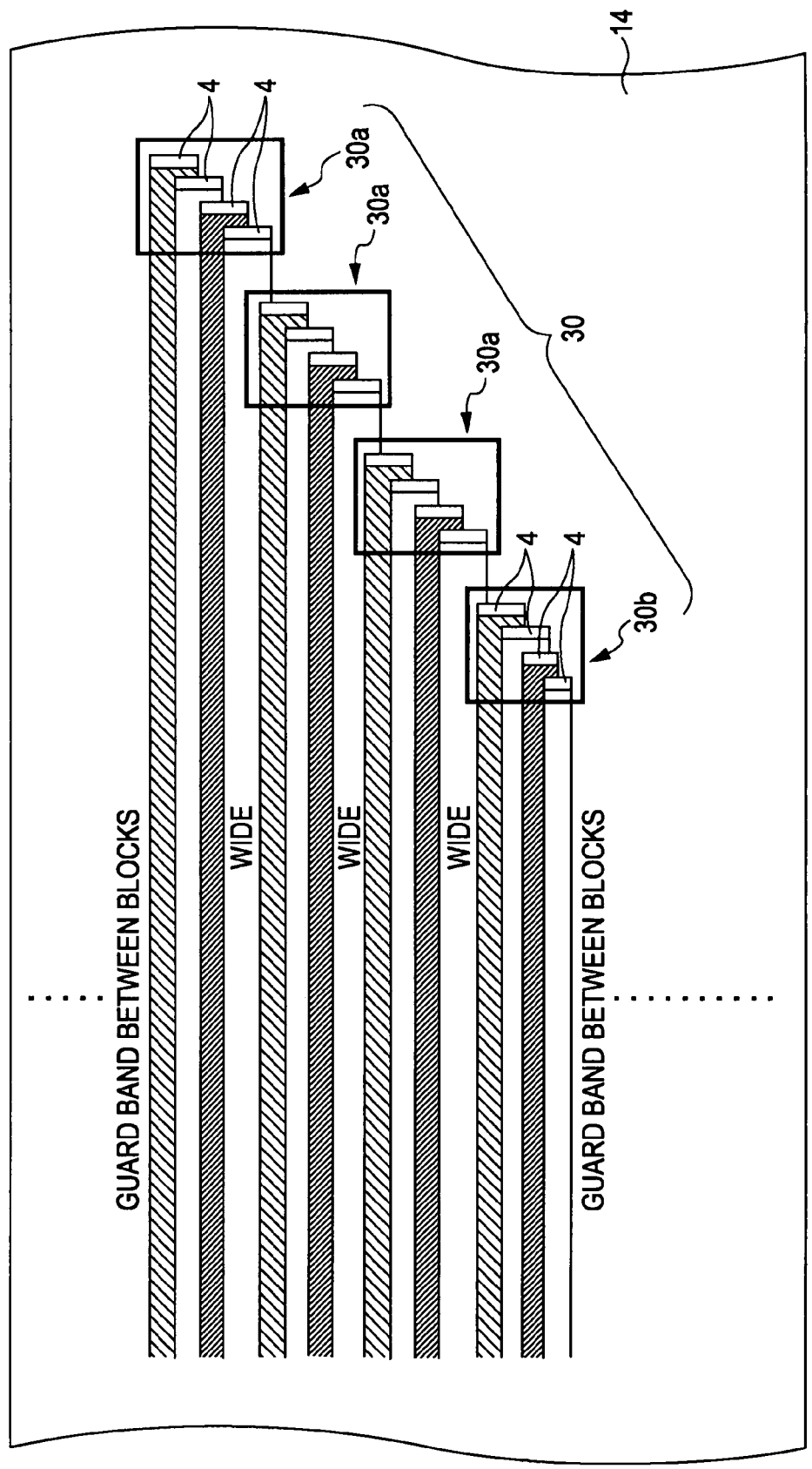

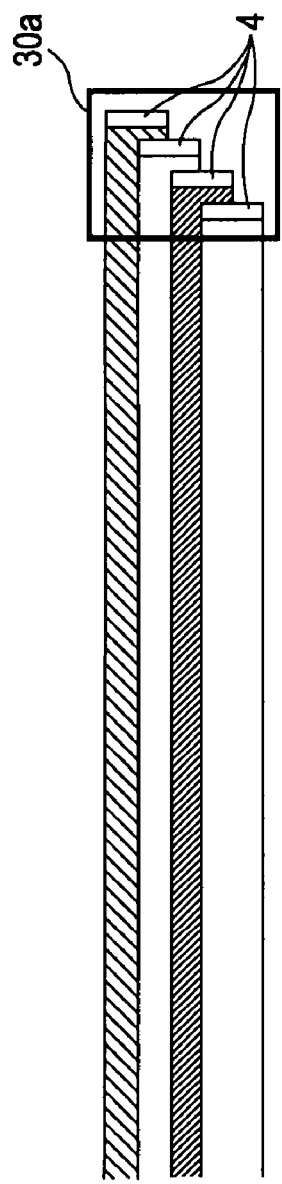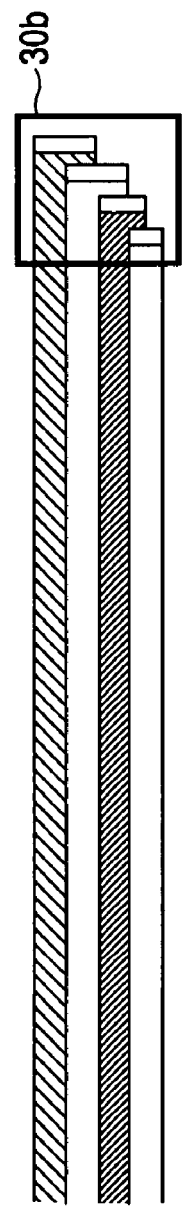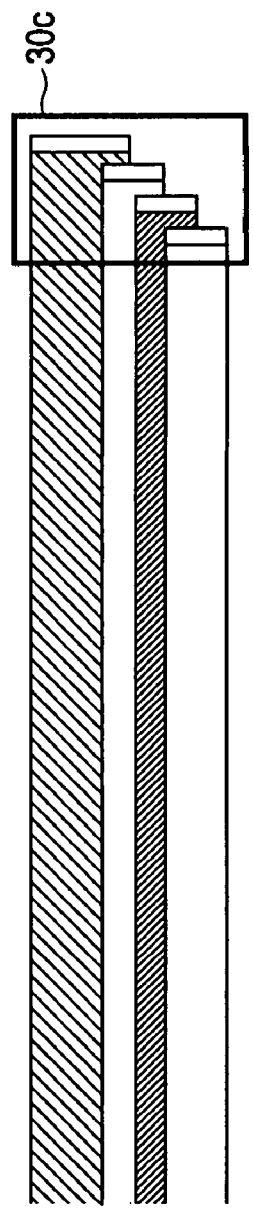
FIG. 10A
STANDARD TYPE IN WHICH ONLY Ch4 IS WIDE
FIG. 10B
FINAL RECORDING TYPE IN WHICH ALL CHANNELS HAVE SAME WIDTH
FIG. 10C
BOTH-SIDE WIDE TYPE IN WHICH Ch1 AND Ch4 ARE WIDE

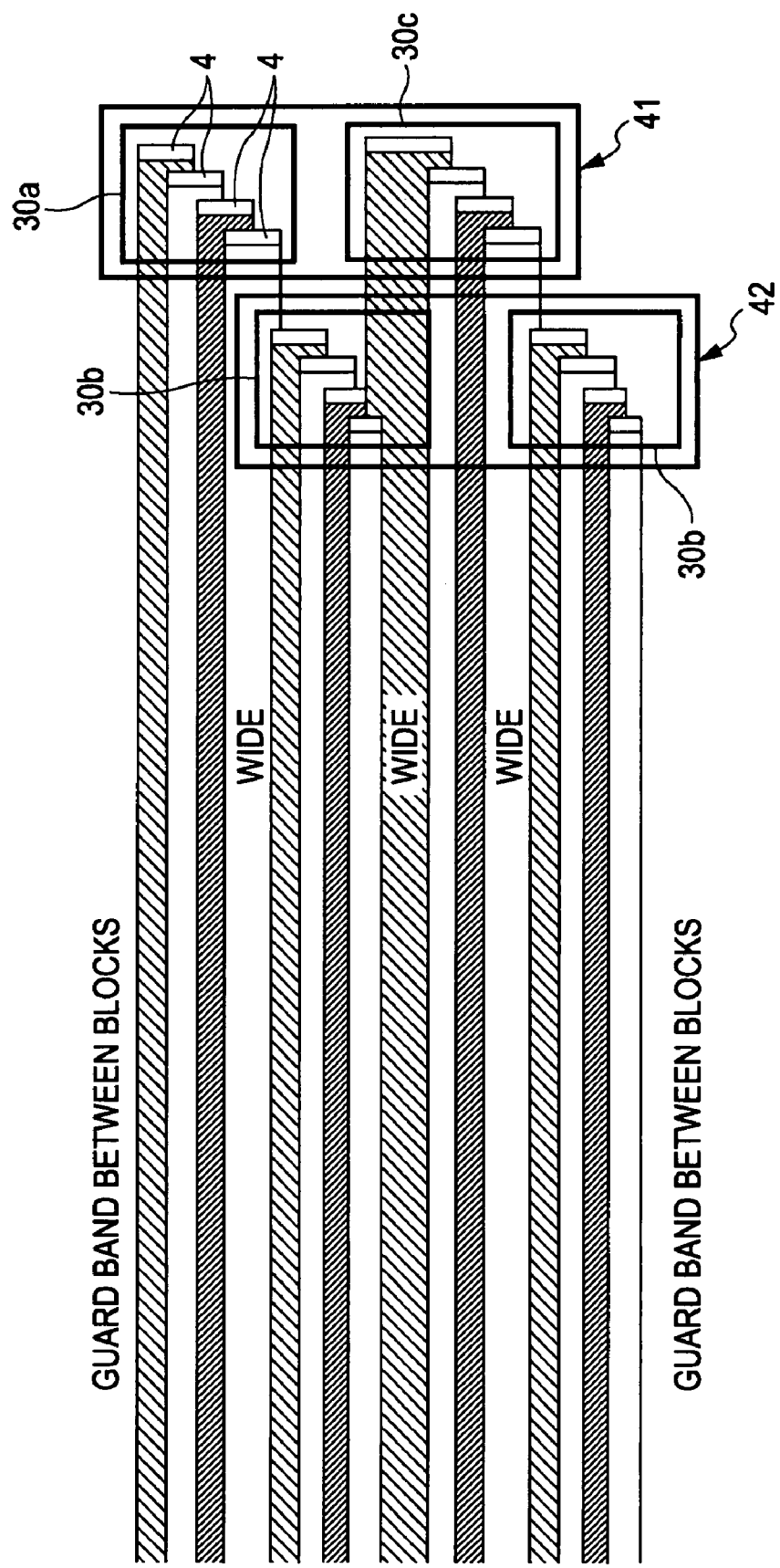

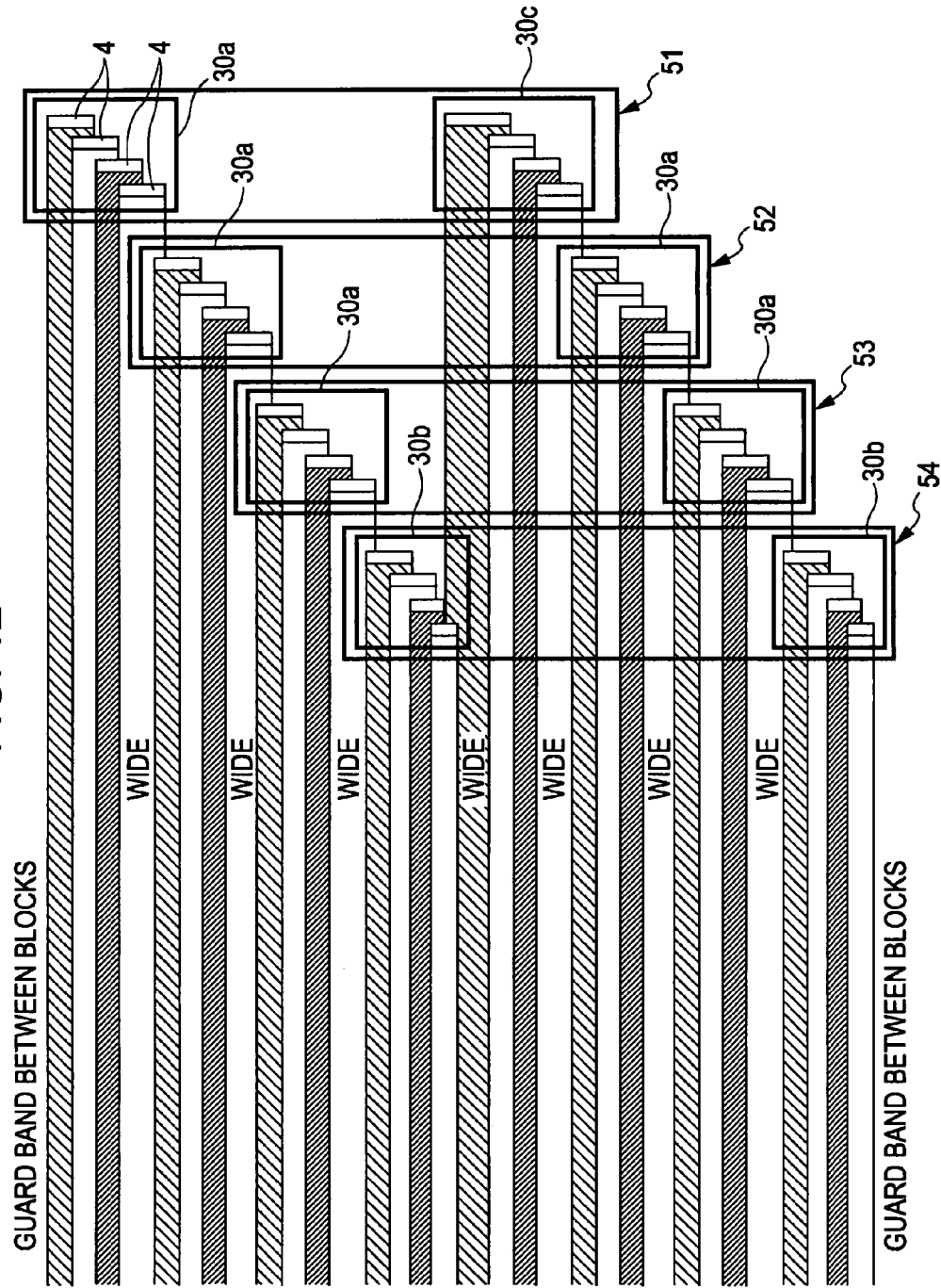

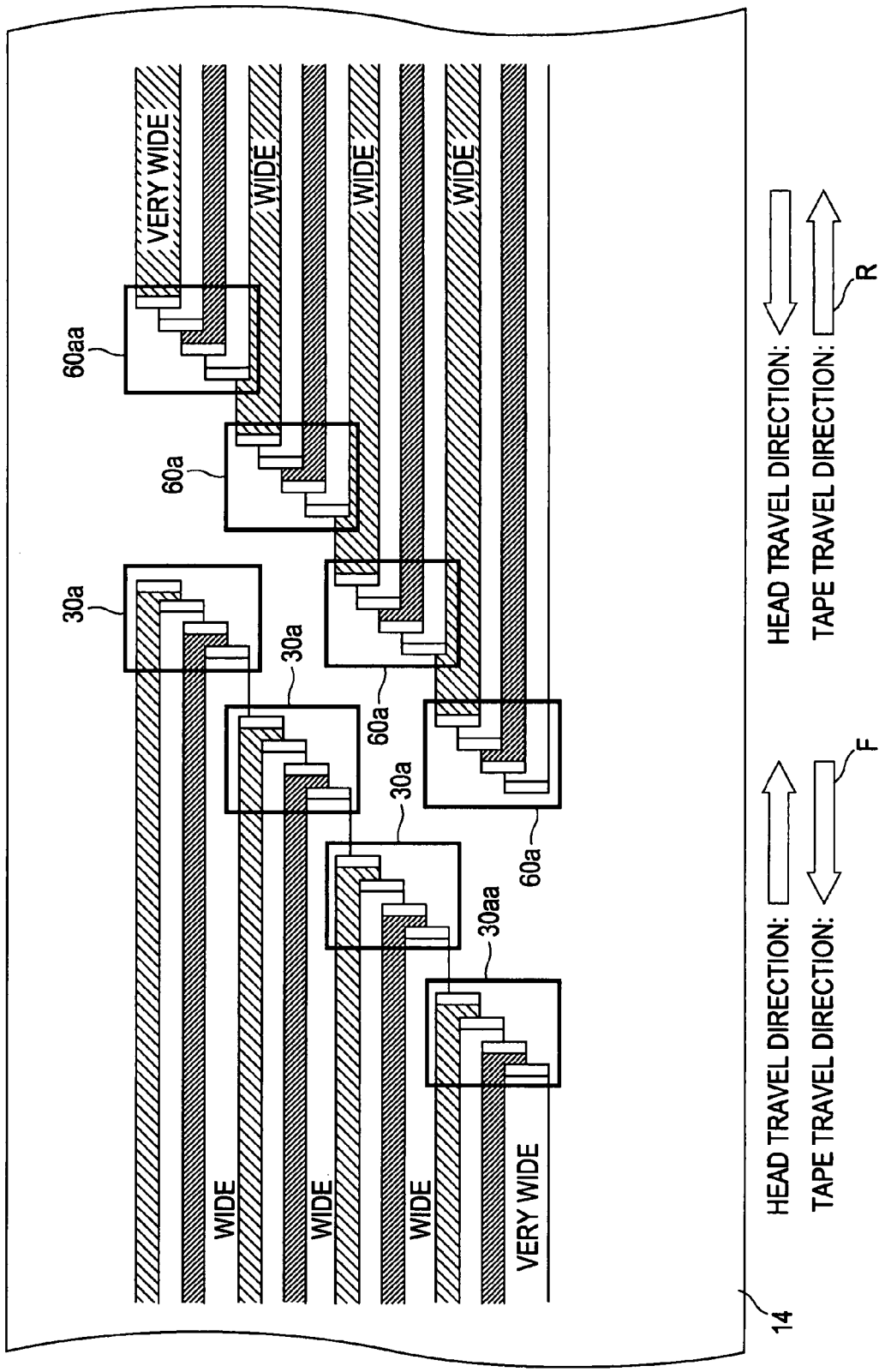

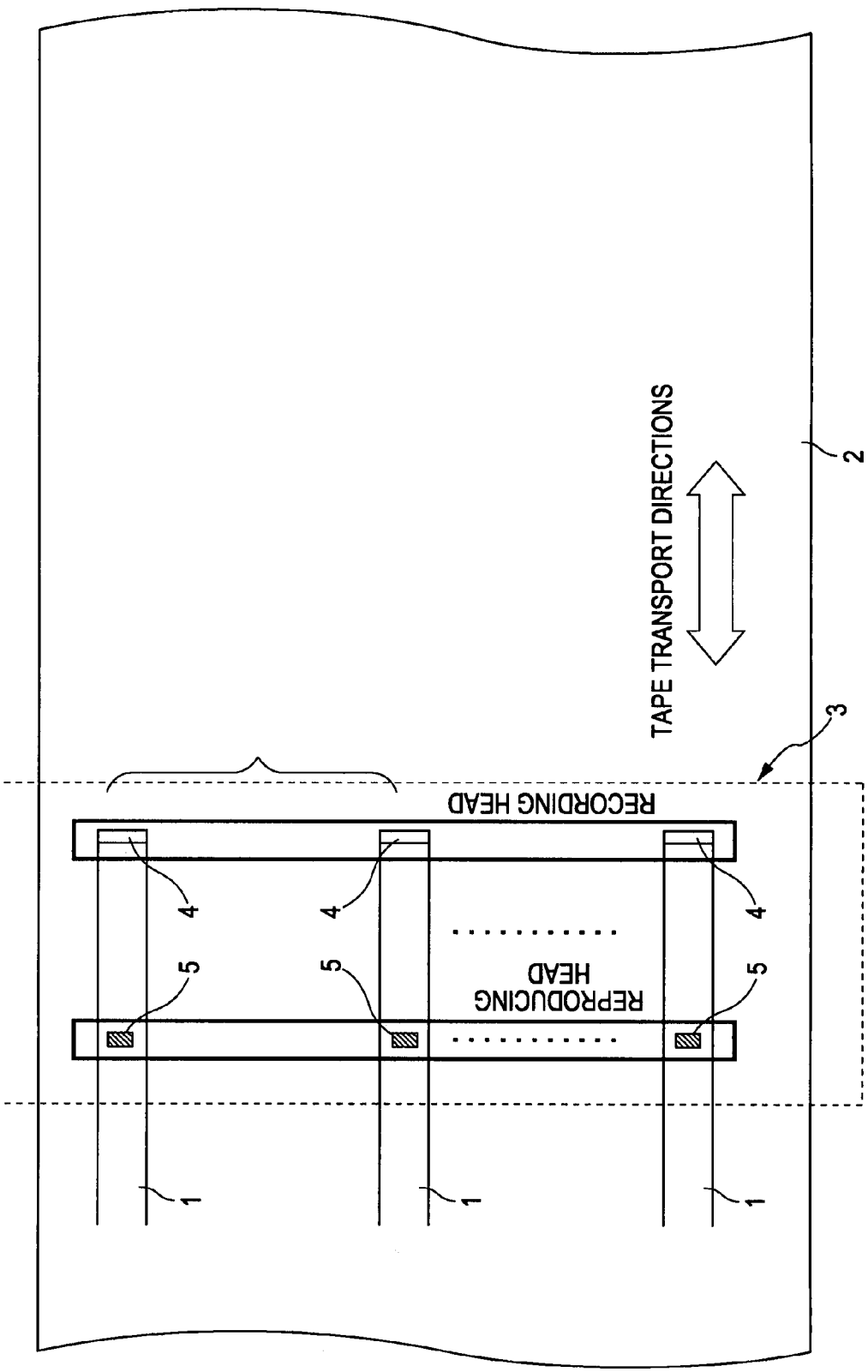

MAGNETIC HEAD DEVICE AND MAGNETIC RECORDING/REPRODUCING APPARATUS

CROSS REFERENCES TO RELATED APPLICATIONS

The present invention contains subject matter related to Japanese Patent Application JP 2006-049603 filed in the Japanese Patent Office on Feb. 27, 2006, the entire contents of which are incorporated herein by reference.

BACKGROUND OF THE INVENTION

1. Field of the Invention

The present invention relates to a magnetic head device, a magnetic recording/reproducing apparatus, and a tape drive system using the magnetic head device. More particularly, the present invention relates to a technology which makes it possible to increase recording density as a result of making it easy to dispose a plurality of magnetic heads (here and hereunder refers to magnetic recording heads and magnetic reproducing heads).

2. Description of the Related Art

In recent years, to realize a higher capacity magnetic recording medium, higher density recording is demanded of magnetic heads. Accordingly, magnetic heads that are suitable for reducing the widths of recording tracks are used.

When high-density recording is performed, a more precise track servo operation is performed. In general, a plastic material is used for a substrate of a magnetic tape itself. Therefore, taking into account deformation resulting from long-time storage, in an AIT-3 format, which is currently in practical use, it is assumed that tape bending is at least 15 μm compared to a track width of 5.5 μm. The AIT-3 format is discussed in, for example, non-patent document 2: "Standard ECMA-329, 8-mm Wide Magnetic Tape Cartridges for Information Interchange-Helical Scan Recording-AIT-3 Format (December, 2001), http://www.ecma-international.org/publications/standards/Ecma-329.htm"

Accordingly, a powerful track servo operation is performed. In general, a system that uses what is called a "double azimuth method" for allowing slight servo displacements and that does not allow a signal to be reproduced even if the servo operation is performed on an adjacent track is put into practical use.

In a linear tape system, in an Ultrium-1 format (that is discussed in, for example, non-patent document 1: "Standard ECMA-319, 12.7-mm-384-Track Magnetic Tape Cartridges-Ultrium-1 Format (June, 2001), http://www.ecma-international.org/publications/standards/Ecma-319.htm"), a track pitch is set at 27.5 μm as a result of previously recording a servo signal. However, in a format which is a continuation of the Ultrium-1 format, the setting of the track pitch is limited to approximately 15 μm.

Accordingly, when a linear serpentine method is performed, an on-track reproducing system is not established unless mechanical precision is increased and a powerful servo operation is performed. Therefore, it is becoming difficult to increase recording density at a lower cost by providing a technology that is merely a continuation of the related art.

Accordingly, for a helical scanning system in which a track pitch has been reduced earlier, to overcome the problem of the difficulty of performing a reproduction servo operation due to the reduction of a track width, what is called a "non-tracking system" is proposed and is put into practical use.

Technologies that are discussed in U.S. Pat. Nos. 1,842,057, 1,842,058, and 1,842,059 are patented technologies that serve as the fundamentals of a non-tracking method. According to the technologies, since an identification operation is performed on the basis of divided blocks with respect to tracks subjected to double azimuth recording by helical scanning, when data is recorded, the data can be reconstructed even if data of a target track is not reproduced by one operation. Accordingly, these technologies allow a margin that is at least four times that of a track controlling operation performed within one track that is used in a related track servo operation.

Japanese Unexamined Patent Application Publication Nos. Hei 04-370580 and Hei 05-20788 propose a signal recording method that assumes a reproducing operation by the non-tracking method.

Studies are conducted to find out whether the non-tracking technology can also be used in linear recording in addition to in helical scanning. The use of the non-tracking technology in linear systems is beginning to be proposed as in, for example, Japanese Unexamined Patent Application Publication Nos. Hei 10-283620 and 2003-132504.

To achieve high-capacity and high-density magnetic recording, it is desirable to provide a plurality of channels. Accordingly, there is a demand for providing a plurality of magnetic heads.

For example, one type of magnetic head device having a plurality of magnetic heads is proposed. In this magnetic head device, a plurality of magnetic recording head elements or magnetic reproducing head elements are laminated on one head substrate through, for example, a magnetic shield layer and an insulating layer.

More specifically, a magnetic head device that is proposed in Japanese Unexamined Patent Application Publication No. 2002-216313 is a magnetic recording head device, and a magnetic head device that is proposed in Japanese Unexamined Patent Application Publication No. 2002-157710 is a magnetic reproducing head device.

In each of the magnetic head devices, a plurality of magnetic recording head layers or magnetic reproducing head layers, each having one magnetic head element, are placed upon a substrate formed of a non-magnetic material, and all of the magnetic head elements are formed so as to be shifted in a direction that is substantially perpendicular to a lamination direction (the shift direction will hereunder referred to as "head width direction").

Accordingly, a plurality of magnetic heads can be disposed, and can be placed near each other or can overlap each other in the head width direction, so that it is possible to reduce the widths of recording tracks.

In related linear systems, from the viewpoint of transfer rate, the use of a plurality of tracks is being pursued. However, from restrictions of a magnetic recording medium that is used, recording is not performed on adjacent tracks at the same time. As discussed, for example, in "12.9 Location of datatrack" on page 58 of non-patent document 1, since eight heads are disposed so as to be separated by 12 tracks (333 μm), when performing recording on a tape, the recording is simultaneously performed on tracks that are separated by 12 tracks, but writing is not performed on adjacent tracks at the same time.

This means that writing of signals on adjacent tracks is performed as a result of mechanically shifting the writing positions. Therefore, although the writing operation is performed on eight tracks, it is substantially performed on tracks that are separated by 12 tracks, as a result of which the writing operation on the adjacent tracks is performed at a completely different timing. Consequently, the writing operation depends upon mechanical precision. This is a technical obstacle to increasing recording density by reducing track pitch.

FIG. 17 is a schematic view showing the relationship between the position of linear tape recording tracks and magnetic heads in a related art. Reference numerals 1 denote tracks that are formed parallel to tape transport directions on a magnetic tape 2.

Reference numeral 3 denotes a head block. Recording heads 4 and reproducing heads 5 are at a surface of the head block 3 that slides with respect to the magnetic tape 2, and oppose the tracks 1.

The recording heads 4 in a same layer are provided so as to be separated from each other by approximately 100 μm in a tape width direction. This is because, due to the amount of space occupied by lead wires and coils of the recording heads 4, the recording heads 4 in the same layer are to be separated by a predetermined interval (such as by 12 tracks).

In FIG. 17, for explanation purposes, the three tracks 1 that are used for one writing operation are only shown. However, actually, when writing operations are performed on the entire length of the tape while transporting the tape and a tape end is reached, the head block 3 moves either upward or downward to perform writing operations again, so that gaps are filled with tracks. (This method is called the "linear serpentine method.")

Therefore, writing of adjacent tracks is performed at a different timing and depends upon mechanical precision. Consequently, recording density is not increased as a result of reducing track pitch.

In the related art, when performing high-density recording, as discussed in, for example, "13.1 Track Configuration" on page 62 and FIG. 40 of non-patent document 2, the following is possible. By setting two recording azimuth directions, in a reproducing operation, heads having the same azimuth angle are capable of reading data, but heads having a different azimuth angle are not capable of reading data.

Accordingly, for example, even if guard bands are not provided, misalignment with respect to a track during a reproducing operation occurs, and a mechanical error corresponding to substantially one track, occurring up to a time tracks of the same azimuth angle are scanned by a head, occurs, it is possible to prevent reading of a signal of a wrong track, so that a large mechanical precision margin is provided. Therefore, even if the track pitch is small at 5.5 μm in the format discussed in the non-patent document 2, the system is established.

However, when the track pitch is reduced to further increase recording density, and overwriting is performed with an azimuth head, leakage magnetic flux that is generated perpendicularly to the head transport directions from a head gap when performing a recording operation with a head having a particular azimuth angle causes previously recorded data to be erased. This is an obstacle to achieving high-density recording as a result of reducing track pitch of a magnetic tape.

Many proposals for achieving more efficient recording operations as a result of providing a plurality of recording heads with respect to one unit have been provided in the past as in, for example, Japanese Unexamined Patent Application Publication Nos. 2003-132504, 2005-11456, 2004-246949, 2003-338012, 2003-123214, 2002-216313, 2001-229516, Hei 2-42612, Sho 58-220218, Sho 63-106909, and Sho 52-128114, and Japanese Patent No. 3375339. However, in the documents other than Japanese Unexamined Patent Application Publication Nos. 2005-11456, 2004-246949, 2003-338012, 2003-123214, 2002-216313, and 2001-229516, recording density is not considered in view of the present situation, that is, structures in which data recording/reproducing speed is given priority over high-density recording are provided. Therefore, these structures may be substantially difficult to use in an area in which track width is equal to or less than 10 μm.

Japanese Unexamined Patent Application Publication Nos. 2005-11456, 2004-246949, 2003-338012, 2003-123214, 2002-216313, and 2001-229516 primarily propose multihead systems where the use of helical scanning systems is assumed. Japanese Unexamined Patent Application Publication No. 2003-132504 considers systems that are characteristic of those using the linear method, but primarily relates to reproducing operations.

SUMMARY OF THE INVENTION

When an attempt is made to increase recording density by the linear method as described above, an on-track servo method, which is a continuation of the related art, has its limitations. Accordingly, studies have been started to find out whether or not it is possible to use the non-tracking method, which is used in helical scanning, in the linear method for further increasing recording density. The studies for further increasing recording density show that reconsidering the systems while focusing on recording operations makes it possible to perform recording and reproducing operations with even higher density on a magnetic tape.

That is, a linear serpentine system is not capable of performing recording on adjacent tracks at the same time due to the characteristics of the tape and heads that are used. Therefore, even if it can perform recording and reproduction on multiple tracks, it is difficult to achieve a track pitch that corresponds to that in the helical scanning system.

Even when performing a reproducing operation, when, for example, deformation of the tape after the recording is considered, there is a limit as to how high the recording density can be made by reducing the track pitch. Therefore, it is more difficult to achieve an on-track servo operation in the reproducing operation than in the recording operation.

This is because the linear serpentine system and the helical scanning system basically differ from each other. For the helical scanning system, the track length can be set relatively small at approximately 30 mm to 120 mm and relatively freely at a certain value by a format design. In contrast, for the linear serpentine system, analogically speaking, the track length is equivalent to the track length of the helical scanning system made infinitely large. Although the actual track length does not exceed the tape length, due to this circumstance, ideally, recording can be carried out most efficiently when the track length and the tape length are equal to each other. Therefore, the actual recording track becomes long.

Due to this circumstance that is characteristic of the linear serpentine system, when a certain margin is not provided when performing recording on adjacent tracks, a disturbance in a tape path causes overwriting of an adjacent track that is not to be actually subjected to recording, or a very narrow portion is formed in the track even if the track is not entirely overwritten.

It is desirable to provide a magnetic head device and a magnetic recording/reproducing apparatus whose recording density is increased.

According to an embodiment of the present invention, there is provided a magnetic head device that performs a recording operation and a reproducing operation in a linear magnetic tape recording system having a plurality of tracks that are formed parallel to each other in a longitudinal direction of a tape. The magnetic head device includes a recording head block including a plurality of recording heads that are disposed in correspondence with respective tracks in a first area including the tracks that are adjacent to each other. The magnetic head device performs the recording operation on the tracks that are adjacent to each other at the same time with the recording head block.

The magnetic head device may further include a reproducing head block including a plurality of reproducing heads disposed in correspondence with tracks in a second area that is wider than the first area in a track width direction, more than one of the plurality of reproducing heads being disposed in correspondence with the corresponding one of the track's.

According to another embodiment of the present invention, there is provided a magnetic recording/reproducing apparatus that performs a recording operation and a reproducing operation in a linear magnetic tape recording system having a plurality of tracks that are formed parallel to each other in a longitudinal direction of a tape. The magnetic recording/reproducing apparatus includes a recording head block including a plurality of recording heads that are disposed in correspondence with respective tracks in a first area including the tracks that are adjacent to each other. The magnetic recording/reproducing apparatus performs the recording operation on the tracks that are adjacent to each other at the same time with the recording head block.

The magnetic recording/reproducing apparatus may further include a reproducing head block including a plurality of reproducing heads disposed in correspondence with tracks in a second area that is wider than the first area in a track width direction, more than one of the plurality of reproducing heads being disposed in correspondence with the corresponding one of the tracks. The magnetic recording/reproducing apparatus performs the reproducing operation by a non-tracking method.

More specifically, a recording/reproducing system that is formed as a result of using the linear serpentine method has a structure in which signal reproduction is performed by the non-tracking method, and in which recording is performed on adjacent tracks at the same time in one direction using heads having a plurality of recording heads formed on one chip and without setting a head azimuth angle. This makes it possible to reduce the track width, so that the density of the tracks that can exist in a tape width direction can be increased to at least twice the current density.

In a linear recording/reproducing system in which a reproducing operation is performed by the non-tracking method and in which heads having a plurality of recording heads formed on one chip are used to perform recording of a plurality of tracks at the same time, the width of each track corresponding to a location where data is overwritten when performing the recording operation is set equal to or greater than a width that causes external disturbance to the system, so that the outputs of all the tracks are provided.

In a tape drive system including the magnetic recording head device, which records a signal on a tape that is a recording medium, and a tape transporting device, which transports the tape along a predetermined transportation path, a margin for head position control, which becomes a bottleneck when trying to increase recording density, can be increased. In addition, when an ordinary track servo operation is performed on a reproduction signal, the problem that the track servo operation is not easily performed during a reproducing operation due to a variation in the track pitch is overcome by the non-tracking method. Accordingly, even if the variation of the track width becomes very large, it is possible to obtain a satisfactory reproduction signal.

(1) According to the above-described embodiments and forms of the embodiments of the present invention, it is possible to increase recording density by reducing track width.

(2) According to the two forms of the embodiments of the present invention, it is possible to provide reproduction outputs from all tracks even if a variation occurs in a linear tape in a widthwise direction.

BRIEF DESCRIPTION OF THE DRAWINGS

FIGS. 2A to 2C illustrate relationships between positions of recording tracks and reproducing heads in the embodiment of the present invention;

FIGS. 3A to 3C illustrate relationships between positions of the recording tracks and the reproducing heads in the embodiment of the present invention, when the widths of the recording tracks are varied;

FIG. 9 shows a specific structure of a recording head block according to an embodiment of the present invention;

FIGS. 10A to 10C show structures of a 4-channel multi-head in which recording track widths are changed in an embodiment of the present invention;

FIG. 11 shows a structure of another specific recording head block according to an embodiment of the present invention;

FIG. 12 shows a structure of still another specific recording head block according to an embodiment of the present invention;

FIG. 13 shows a structure of a specific recording head block according to an embodiment of the present invention that is formed as a forward-and-reverse-direction recording head block;

FIG. 17 shows a head block and recording tracks of a linear tape in a related art.

DESCRIPTION OF THE PREFERRED EMBODIMENTS

Figure 1A:
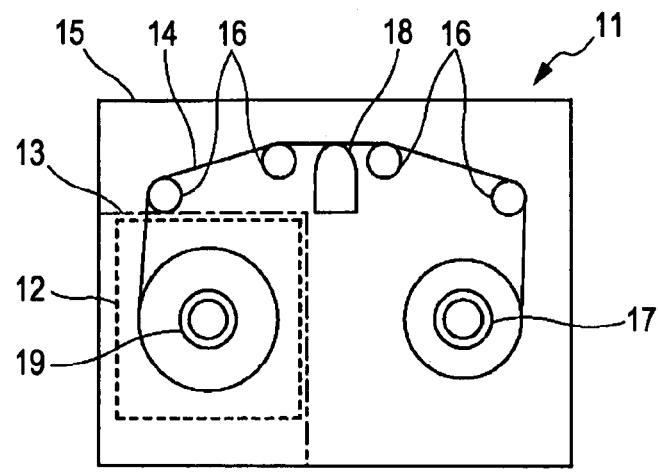
FIGS. 1A to 1C show an embodiment of the present invention, with FIG. 1A being a schematic structural view of a magnetic recording/reproducing apparatus, FIG. 1B illustrating a state in which a recording/reproducing head block is mounted, and FIG. 1C illustrating a recording pattern.
Figure 1B:
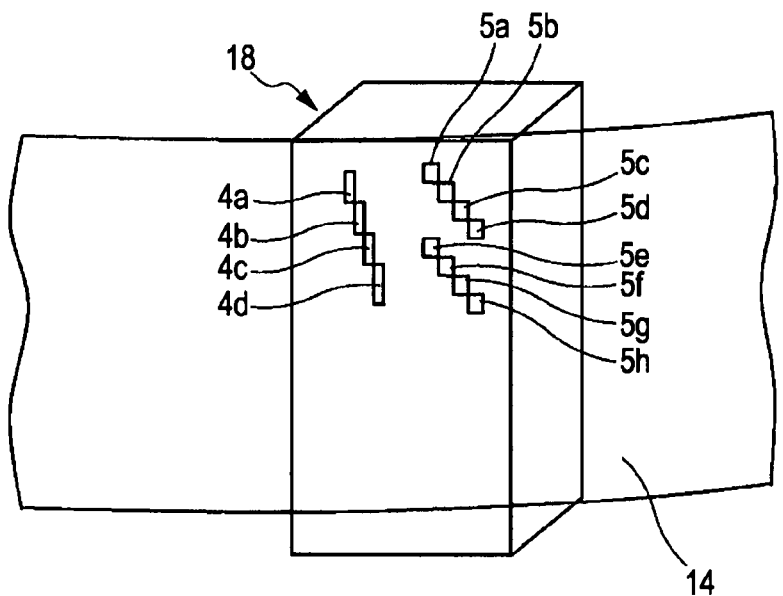
Figure 1C:
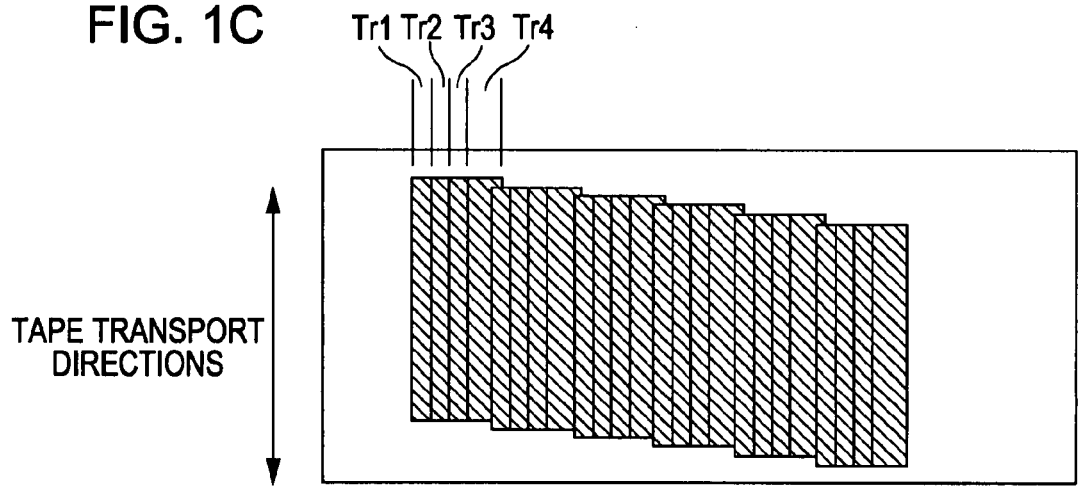

Embodiments of the present invention will hereunder be described with reference to the drawings. The present invention is not limited to the following embodiments. FIGS. 1A to 1C show an embodiment of the present invention. FIG. 1A is a schematic view of a magnetic recording/reproducing apparatus (tape drive system using a linear method), and FIG. 1B is a conceptual diagram showing a state in which a magnetic head device is mounted.

In FIG. 1A, a magnetic recording/reproducing apparatus 11 includes a cartridge mounting unit 13, a transporting mechanism (not shown), a tape winding unit 17, and a recording/reproducing head block 18. A tape cartridge 12 is mounted to the cartridge mounting unit 13. The transporting mechanism draws out a magnetic tape 14 mounted to the cartridge mounting unit 13 into an apparatus body 15 and transports the magnetic tape 14 along a predetermined transportation path by tape guides 16. The tape winding unit 17 winds up the magnetic tape 14 transported into the apparatus body 15 from a tape reel 19. The recording/reproducing head block 18 records or reproduces a magnetic signal as a result of coming into sliding contact with the magnetic tape 14 that is transported into the apparatus body 15.

The magnetic tape 14 is accommodated in the tape cartridge 12 and transported. When the magnetic tape 14 is mounted to the cartridge mounting unit 13, a tape path shown in FIG. 1A is formed, and the magnetic tape 14 passes the tape guides 16 and slides on the recording/reproducing head block 18 so as to be in proper contact with the head block 18.

As shown in FIG. 1B, four recording heads 4a to 4d are continuously disposed at a magnetic tape sliding contact surface of the recording/reproducing head block 18 so as to be shifted from each other in a tape width direction and a tape longitudinal direction and so as to be in correspondence with respective tracks that are situated in a first area including the tracks that are adjacent to each other (four tracks in FIG. 1B). (This structure corresponds to a 4-channel multi-head.)

In addition, eight reproducing heads 5a to 5h are disposed at the magnetic tape sliding contact surface of the recording/reproducing head block 18 so that more than one reproducing head is formed with respect to each one of the tracks in a second area. The second area is wider than the first area in the track width direction, that is, is wider than a tape-widthwise-direction length of the four recording heads 4a to 4d used to form the four tracks. (This structure corresponds to an 8-channel multi-head.)

The eight reproducing heads include the four reproducing heads 5a to 5d continuously disposed so as to be shifted from each other in the tape width direction and the tape longitudinal direction and the four reproducing heads 5e to 5h continuously disposed so as to be separated from the four reproducing heads 5a to 5d by an amount corresponding to four reproducing heads in the tape width direction and so as to be shifted from each other in the tape width direction and the tape longitudinal direction.

Accordingly, the four recording heads 4a to 4d of the recording head block and the eight reproducing heads 5a to 5h of the reproducing head block are formed in the same recording/reproducing head block 18.

A drive body of the apparatus shown in FIG. 1A is a modification of an HP Ultrium 448 tape drive apparatus. A head chip is based on a unique specification, and an adjustment of the positions of the heads and changes in a recording operation can be performed. In addition, by using a unique specification for a signal processing unit and component parts following the signal processing unit, they are put in a state that allows measurement of an error rate by a random serial signal. In a mechanical precision evaluation, recording signals are finally confirmed and compared, so that they are used after confirming that no problems exist.

First Embodiment

FIG. 1C shows a recording pattern that is recorded by the above-described apparatus. Since the tracks to be to be recorded by one operation is recorded by four-track heads (that is, the recording heads 4a to 4d), tracks Tr1 to Tr3 are recorded with a width of 5 μm, and only a track Tr4 is recorded with a width of 20 μm.

Therefore, the total sum of the widths of all of the tracks is equivalent to a track pitch of 35 μm, so that a track width per one channel (1Ch) is equal to 35/4 or 8.75 μm. In other words, the relationship Tr1≅Tr2≅Tr3<Tr4 is established. When the number of heads is n, the relationship Tr1≅Tr2≅ . . . ≅Tr(n−1)<Tr(n) is established.

A present track precision is such that an LTO (Linear Tape Open)-2 track pitch is 20.2 μm. While maintaining the precision that is currently practically used, an average track density can be at least doubled. The recording heads 4a to 4d and the reproducing heads 5a to 5h are all unidirectional azimuth heads, so that they are not double azimuth heads that are generally used in high-density recording.

Only the track Tr4 (that is the recording track that is recorded by the recording head 4d) has a width that is larger than the widths of the other tracks to provide a track margin. Even if a track provided by an nth scanning and a track provided by an (n+1)th scanning overlap each other due to a scanning interval being reduced as a result of scanning variations during a recording operation, since the width of the track Tr4 is large in correspondence with the track margin, it is possible to provide the recording track Tr4 by the nth scanning that precedes the (n+1)th scanning.

To show the advantages provided with accordance with the present invention, track density and required track precision that can be achieved in accordance with the present invention are indicated in the following Table 1. Here, an LTO-2 tape having the highest track density at the time of the filing of the application is used as a comparative example. When, in the future, a track precision of an LTO technology or technologies similar thereto is increased, the required track precision can be used in correspondence with the increased precision. Therefore, while the fact that the average track pitch is desirable does not change, the apparatus according to the embodiment of the present invention is superior. The details will be discussed below.

TABLE 1

|  | LTO-2 (COMPARATIVE EXAMPLE) | FIRST EMBODIMENT |
|---|---|---|
| AVERAGE TRACK PITCH (μm) | 20.2 | 8.75 |
| TRACK DENSITY (TPI) | 1257 | 2903 |
| REQUIRED TRACK PRECISION (μm) | 20.2 | 20.0 |

As is clear from Table 1, although the required track precisions are substantially the same, the apparatus according to the embodiment of the present invention makes it possible for the average track pitch to increase the recording density by approximately 2.3 times that of the comparative example.

Here, since magnetoresistive (MR) heads are used for the reproducing heads $5a$ to $5h$, the track pitch is 5 μm and the head width is 2.5 μm from the viewpoint of output. However, it is possible to further increase recording density as a result of using heads, including giant magnetoresistive (GMR) heads, whose outputs are higher than the outputs of the heads which are discussed here.

If the track width is made the same as that of a helical scanning head that is discussed below, during recording, it is possible that:

(3 μm×3 channels)+20 μm=29 μm,

29 μm÷4 channels=7.25 μm (track width per 1 channel)

Therefore, even if track control precisions are the same, it is possible to increase the density by a factor of approximately 2.8. Consequently, the technology according to the embodiment of the present invention is a very useful technology when performing high-density recording that can produce a sufficient reproduction output even if a GMR head or the like is used for a reproducing operation and the tracks are narrower. Since MR heads and GMR heads are not used as recording heads, inductive heads are used for a recording operation.

The studies have been conducted this time first and foremost as a test, so that a multi-head that is used to form four continuous tracks on one head chip is used. However, if it is possible to use, for example, eight heads for one head chip, in terms of calculation (5 μm×7)+(20 μm×1)=55 μm/8 channels. Therefore, the average track pitch is 6.875 μm. Consequently, even if the servo technology that is currently in practical use is used, a high-density recording operation whose recording density is increased by a factor of approximately 1.3 can be achieved, so that it is possible to achieve a track density that is increased by a factor of approximately 3 even if the same servo technology as that currently used is used. Further, when a high-output GMR head is used, an even higher track density is achieved, so that it is beneficial to use the present invention due to the practical use of multi-channel and higher output heads.

If such a structure is used, heads that can perform recording on four continuous adjacent tracks can be provided so as to be separated by a few tracks as in the related linear serpentine method. In addition, when a four-continuous-tracks-×-2 structure is used, even if a shortest recording wavelength and the tape transport speed are remain the same, the transfer rate can be made the same as that in the related art. Further, if it is possible to form a four-continuous-tracks-×-8 structure as it currently is, it is possible to make the transfer speed up to four times higher than the current transfer speed.

To reproduce the signals that have been recorded up to now, a non-tracking system that uses MR heads is used. It is a reproducing system whose basic structure is equivalent to that of the reproducing system discussed in Japanese Unexamined Patent Application Publication No. 2003-132504.

The reproducing system differs from that discussed in the patent document as follows. Since a track width for one channel is large, in the apparatus that is proposed this time, a reproducing operation of a width equal to 35 μm±20 μm+a margin of 5 μm=80 μm is performed considering a track servo control range. Therefore, 16 head chips are mounted so as to be shifted by 5 μm to make it possible to perform the reproducing operation over the entire width. For the reproducing operation, actually, two 8-channel heads are disposed and mounted adjacent to each other to form tracks corresponding to 16 channels. However, ideally, it is obviously desirable to form them using one head chip.

For example, it is possible to mount four heads having 4-channel heads on one head chip. Alternatively, for example, 20-channel heads may be formed on one head chip, so that the reproduction width is equal to or greater than that corresponding to 16 channels. In this case, even if the corresponding track width becomes 80 μm, it is obvious that the essence of the reproducing system does not change.

To reduce the number of heads, when performing a reproducing operation, it is possible to re-form a signal as a result of performing two or more scanning operations at shifted locations rather than performing a scanning operation using one path. A reproducing operation other than that using the non-tracking technology does not affect the present invention.

In the embodiment, as shown in FIG. 2A, a reproduction head pitch Hp is ½ of a recording track pitch Tp, and a reproduction head width Hw is equal to or less than ½ of the recording track pitch Tp.

FIGS. 2A to 2C illustrate relationships between the positions of recording tracks Tr, which are recorded by the recording heads, and reproducing heads 5 in the embodiment of the present invention. Here, FIG. 2A shows a case in which the reproducing head width Hw is equal to Tp/2, FIG. 2B shows a case in which a reproducing head width $Hw_{n1}$ is smaller than Tp/2, and FIG. 2C shows a case in which a reproducing head width $Hw_{n2}$ is even smaller than Tp/2.

As shown in FIGS. 2A to 2C, when the width of each recording track Tr is equal to a standard width Tw, even if the reproducing head width is any one of Hw, $Hw_{n1}$, and $Hw_{n2}$, no reproducing head 5 moves into an adjacent track during the reproducing operation.

However, as shown in FIGS. 3A to 3C, if the width of each recording track Tr is $Tw_{n1}$ that is smaller than the standard width Tw or is $Tw_{n2}$ that is even smaller than the standard width Tw, the reproducing heads 5 move into adjacent tracks at locations that are marked "NG" in FIGS. 3A and 3B during the reproducing operation.

More specifically, in the case in which the head reproducing width is equal to Hw that is equal to Tp/2 in FIG. 3A, the heads move into respective adjacent tracks in both scanning operations. However, when the reproducing head width is equal to $Hw_{n1}$ that is smaller than Tp/2 in FIG. 3B, or when the reproducing head width is equal to $Hw_{n2}$ that is even smaller than Tp/2 in FIG. 3C, the heads do not move into adjacent tracks in at least one of the scanning operations.

Therefore, the smaller the reproducing head width is than Tp/2, it is possible to perform the reproducing operation even if the recording tracks are narrow or the reproduction scanning pitch is increased.

Second Embodiment

Figure 4A:
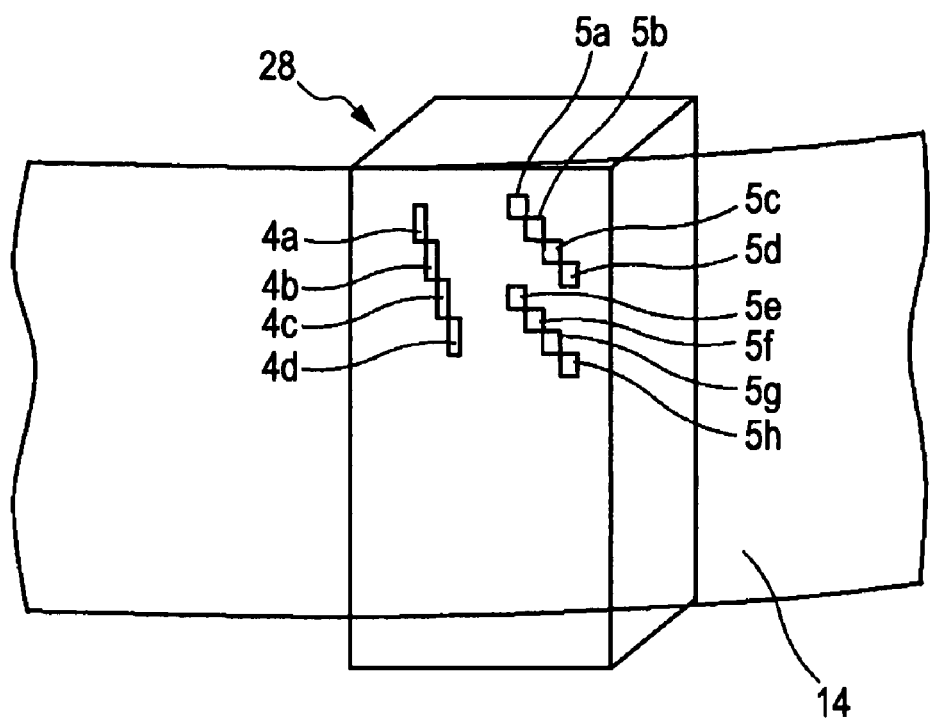
FIGS. 4A and 4B show another embodiment of the present invention, with FIG. 4A illustrating a state in which a recording/reproducing head block is mounted and FIG. 4B illustrating a recording pattern.
Figure 4B:
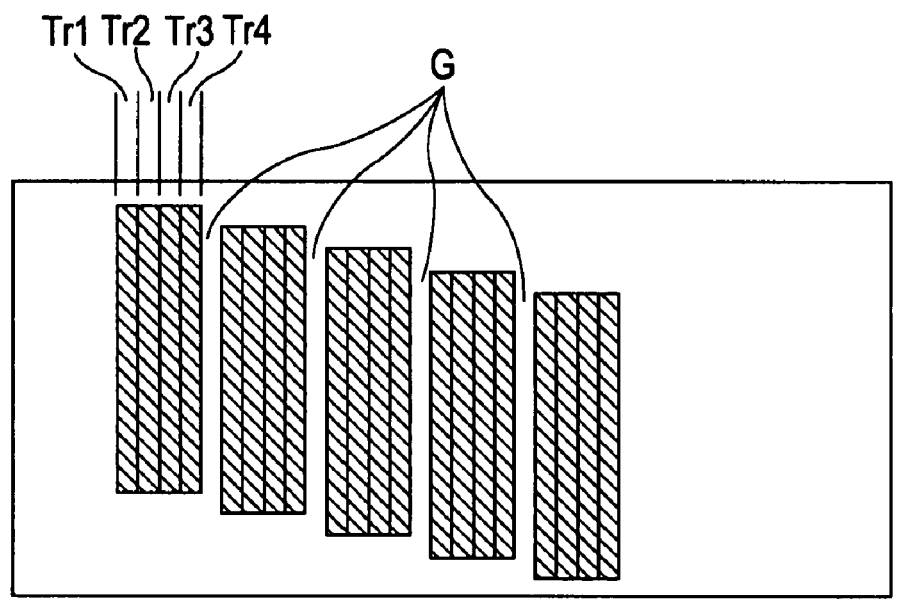

Next, a second embodiment in which all recording track widths of, for example, the aforementioned four recording heads $4a$ to $4d$ of the recording head block are the same will be described with reference to FIGS. 4A and 4B. FIG. 4A shows the relationship between the position of a recording/reproducing head block 28 and the position of a magnetic tape 14. In the head block 28, the recording track width of a recording head $4d$ corresponding to the recording head $4d$ shown in FIG. 1B, is made equal to the recording track widths of recording heads $4a$ to $4c$, and reproducing heads $5a$ to $5h$ have the same structure as those shown in FIG. 1B.

The recording heads 4a to 4d and the reproducing heads 5a to 5h are all unidirectional azimuth heads. They do not use a double azimuth method that is generally used in high-density recording. A drive body itself is the same as that used in the first embodiment (see FIG. 1A) except that only a head unit is changed as shown in FIG. 4A.

In the second embodiment, track pattern widths for a recording operation are all 5 μm. As illustrated by a recording pattern shown in FIG. 4B, to provide a gap of 15 μm between a final track and a track that follows the final track as a result of transporting a tape, the pattern is in a state in which guard bands (G) can be formed.

The concept "guard band" has existed for a long time. For example, even in a VHS format (IEC60774-1), guard bands appear between tracks. In the pattern that is characteristic of the embodiment of the present invention, guard bands, which appear in a related format, appear symmetrically with respect to the tracks, so that the guard bands do not appear in an unbalanced state.

That is, on the assumption that a track servo operation is performed, when helical scanning is carried out, guard bands between the recording tracks are formed symmetrically or substantially symmetrically (even if formed asymmetrically) with respect to one or all of the tracks.

The situation is exactly the same for the case in which a linear format is used. If the guard bands do not appear substantially symmetrically with respect to all of the tracks, it is difficult to trace all of the tracks. Therefore, it is difficult to reproduce an original signal. The fact that guard bands appear every few tracks is characteristic of the present invention. When attention is focused on the tracks, substantially symmetrical tracks and asymmetrical tracks are mixed. Therefore, a significant characteristic is that, when non-tracking reproduction is not performed in combination, the original data is not reproduced. Accordingly, this cannot be arrived at on the basis of the technology at that time.

Here, the advantages of the second embodiment are the same as those of the previously described first embodiment except that no-signal portions appear at the tracks during a recording operation. As illustrated by the recording pattern shown in FIG. 4B, when four tracks are formed by one recording operation, the recording is performed from tracks Tr1 to Tr4 with the pattern widths of 5 μm. However, a non-recording portion, that is, the guard band (G) having a width of 15 μm exists until a following track Tr1. Therefore, the total track width is substantially equivalent to a track pitch of (5 μm×4 tracks)+(non-recording portion width of 15 μm)=35 μm. Therefore, the average track width per one channel is 35÷4=8.75 μm.

If signals of n tracks are recorded, a deviation amount Mh of the head unit can be represented as follows:

$$Tr1 \cong Tr2 \cong \ldots \cong Tr(n)$$

$$Mh = Tr1 + Tr2 + \ldots Tr(n) + G$$

When a track servo technology for a writing operation using the linear method that is currently in practical use is used, the LTO-2 track pitch is 20.2 μm. Therefore, when the track servo technology for the currently practically used writing operation is used, the average track density can be increased by a factor of 2 or more, so that the invention remains advantageous for the future.

To indicate that the invention is advantageous, the track density and required track precision that can be achieved in the invention are given in the following Table 2. Here, an LTO-2 tape having the highest track density at the time of the filing of the application is used as a comparative example.

Since in terms of format the density in the second embodiment is the same as that in the first embodiment, the recording density in the second embodiment is numerically the same as that in the first embodiment.

TABLE 2

|  | LTO-2 (COMPARATIVE EXAMPLE) | SECOND EMBODIMENT |
|---|---|---|
| AVERAGE TRACK PITCH (μm) | 20.2 | 8.75 |
| TRACK DENSITY (TPI) | 1257 | 2903 |
| REQUIRED TRACK PRECISION (μm) | 20.2 | 20.0 |

As is clear from Table 2, although the required track precisions are substantially the same, the apparatus according to the embodiment of the present invention makes it possible for the average track pitch to increase the recording density by approximately 2.3 times that of the comparative example.

Here, since MR heads are used for the reproducing heads 5a to 5h, the track pitch is 5 μm and the head width is 2.5 μm from the viewpoint of output. However, it is possible to further increase recording density as a result of using heads, including GMR heads, whose outputs are higher than the outputs of the heads which are discussed here.

This time, a multi-head used to form four tracks on one head chip is used as a test. However, if it is possible to use, for example, eight heads for one head chip, in terms of calculation (5 μm×8)+(15 μm×1)=55 μm/8 channels. Therefore, the average track pitch is 6.875 μm. Consequently, even if the servo technology that is currently in practical use is used, a high-density recording operation whose recording density is increased by a factor of approximately 1.3 can be achieved, so that it is possible to achieve a track density that is increased by a factor of approximately 3 even if the same servo technology as that currently used is used.

Further, when a high-output GMR head is used, an even higher track density is achieved, so that it is beneficial to use the present invention due to the practical use of multi-channel and higher output heads.

To reproduce the signals that have been recorded up to now, a non-tracking system that uses MR heads is used. It is a reproducing system whose basic structure is equivalent to that of the reproducing system discussed in Japanese Unexamined Patent Application Publication No. 2003-132504.

As discussed above, if only the recording densities and recording servo precisions in the first and second embodiments are compared, they are the same. In the second embodiment, however, a more symmetrical structure can be provided when forming a head chip, and the width for forming the head chip can be made small, so that there is a higher probability of the manufacturing process of a head becoming simpler in the second embodiment. Therefore, when costs are considered, the second embodiment is desirable. However, substantially, the first and second embodiments do not considerably differ from each other.

At what value an additional track feed amount becomes an optimum value will be considered. In the second embodiment, the width of each of the tracks Tr1 to Tr4 is 5 μm, and an additional feed amount is 15 μm. However, it is obvious that, considering the recording density, the smaller the additional feed amount, the better. Therefore, in general, an additional feed amount that is greater than ½ of a recording track is considered sufficient.

In the embodiment, the restriction that the additional feed amount is 15 μm is determined by the precision of adjustment of the positions of the tracks. In the case of the embodiment, the additional feed amount is limited to 20 μm in total. Therefore, when an adjustment margin is considered, an upper limit thereof may not be required. However, when increasing the recording density, 5 μm×4 tracks+margin≦20 μm×4 tracks Consequently, the margin is equal to or less than 60 μm.

This means that, in the case where a limiting margin is E μm when a mechanical adjustment limit is x μm, the number of heads that are mounted to one head chip is n, and a recording width is y μm, the following Formula (1) is established:

$$E=(x-y)\times n \text{ μm} \quad (1)$$

Here, in the second embodiment, the track widths are substantially the same. In the case where the definitions of the previous section are considered, when, for example, there are n tracks, the head width for forming an nth track is allowed to be up to a value that is mentioned in the previous section as in Formula (2):

$$Tr(n)=x+y \text{ μm} \quad (2)$$

Therefore, the definitions up to this point are the same. When the head width for forming an nth track satisfies the relationship of Formula (2), the second embodiment becomes the equivalent of the first embodiment.

Next, a method in which adjustments are made in the first and second embodiments so that recording and reproducing operations can be performed by a related method is compared with a method in which adjustments are made by the present invention, so that degrees of output variations due to drive adjustments are investigated. The results of the investigations are given below.

Comparative Example 1

Since a comparative example is used this time, an LTO-1 drive that is currently used in the linear serpentine method is reconstructed, and a double azimuth method in which heads having different azimuth angles are mounted is used, so that a system which can increase the adjustment margin is used.

Since increasing the recording density is kept in mind, recording of adjacent tracks is performed with heads having different azimuth angles. Therefore, a track pattern image is obtained by using a track pattern of a helical scanning method in a linear method.

Figure 5:
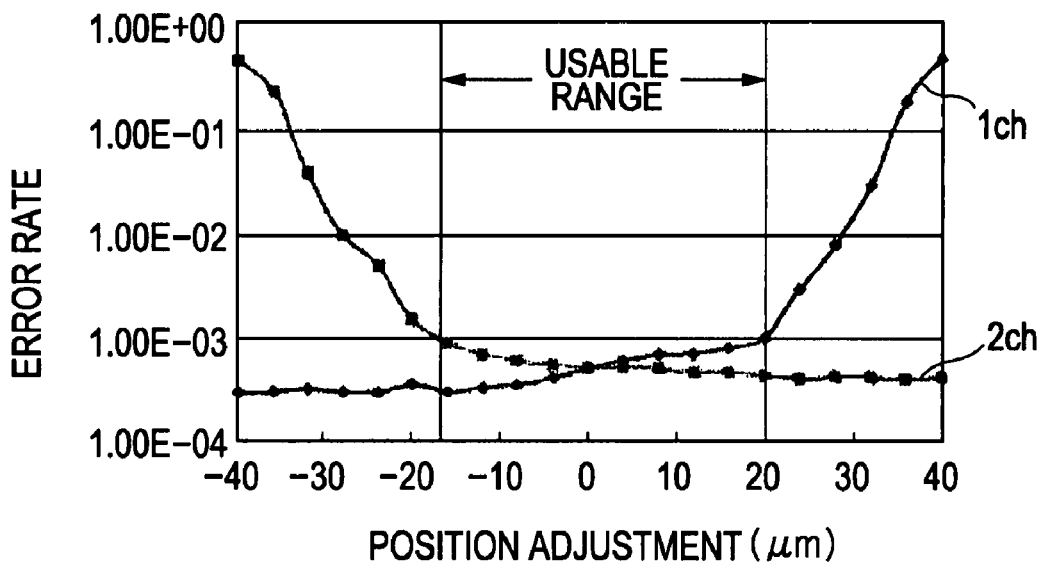
FIG. 5 is a characteristic diagram showing the relationship between head adjustment and error rate in a related art that uses a linear method.

Accordingly, heads having a track pattern of 22 μm are used as recording heads, and a mounting height is adjusted to observe error rate. The results are given in FIG. 5.

In the test conducted this time, when the head height is adjusted, an optimum value appears at only one point, as a result of which error rate is increased at points other than the optimum point. Therefore, a range in which the head height adjustment becomes optimum in an error rate allowable range corresponds to the adjustment margin.

In general, when a margin of a product is considered, it is desirable to adjust an initial error rate value to a value that is equal to or less than $1\times 10^{-3}$. In the example shown in FIG. 5, an adjustment error range is generally assumed to be 20 μm. Since, in the comparative example, heads having different azimuth angles are used, the optimal points of the adjustments for 1 ch and 2 ch appear differently, as a result of which their adjustment ranges are determined. However, a non-azimuth head that is currently used in the linear serpentine method is generally usable only in the optimal point range that is illustrated this time.

Figure 6:
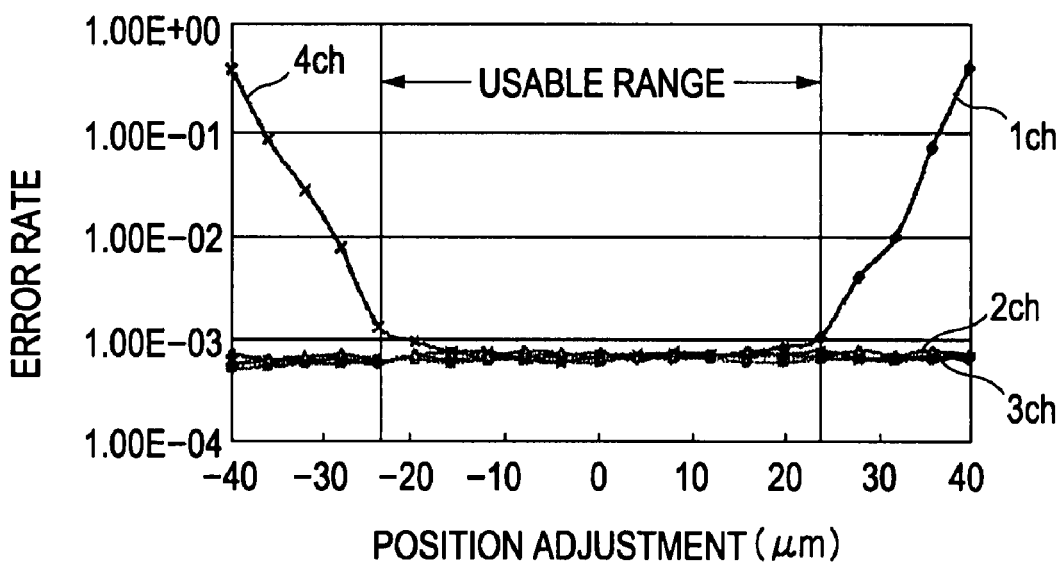
FIG. 6 is a characteristic diagram showing the relationship between head adjustment and error rate according to a first embodiment of the present invention.
Figure 7:
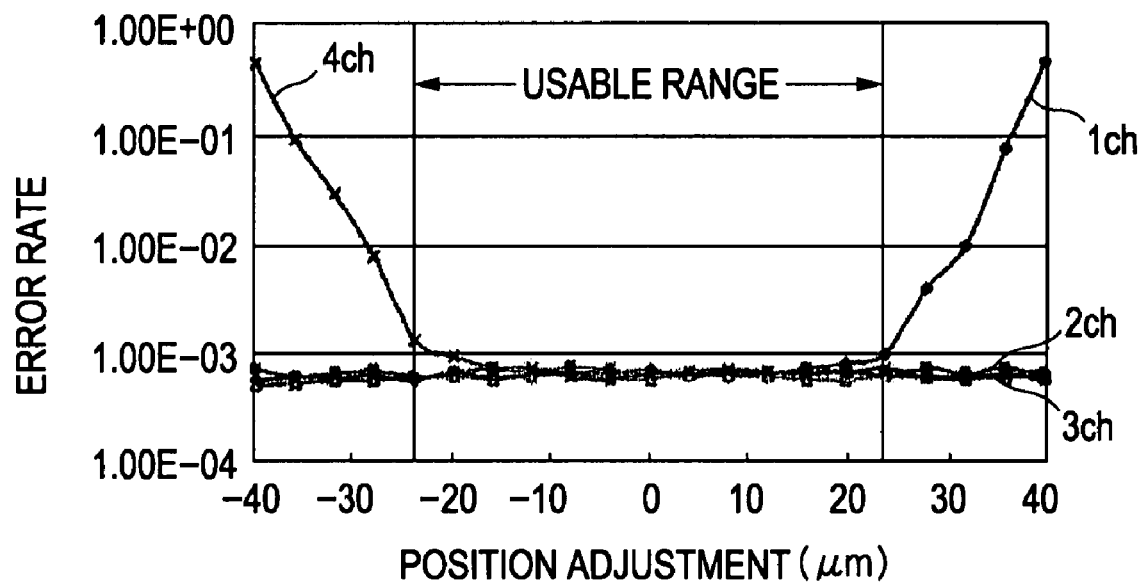
FIG. 7 is a characteristic diagram showing the relationship between head adjustment and error rate according to a second embodiment of the present invention.

The results of measurements for the first embodiment by a measuring method that is the same as that of the previous section are shown in FIG. 6 and the results of similar investigations for the second embodiment are shown in FIG. 7. The results show that, in each of the first and second embodiments, a stable optimal adjustment point width is wide, and the error rate starts to increase from either ch 1 or ch 4 outside its associated optimum adjustment point area.

This means that, when the present invention is applied, a wide stable area of positional adjustment exists. However, when the present invention is applied, the average track pitch is reduced, so that the usable area including an allowable range is generally 20 μm. Therefore, the adjustment error range remains the same. However, the adjustment error remains the same even if the recording density is increased as a result of reducing the average track width, so that the present invention provides an advantage.

Comparative Example 2

Figure 8:
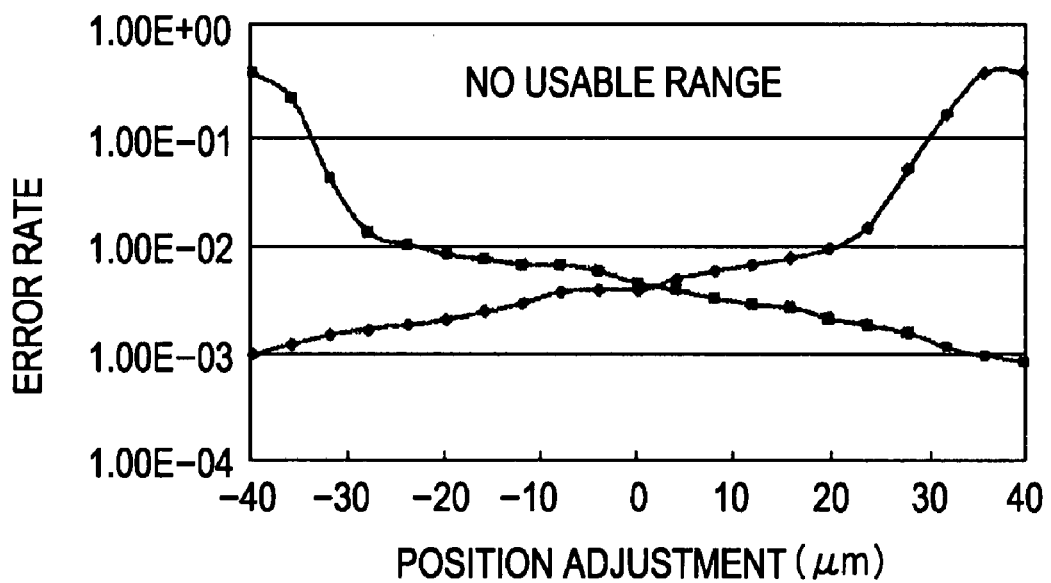
FIG. 8 is a characteristic diagram showing the relationship between head adjustment and error rate when tracks are narrowed in the related art.

Using the system of Comparative Example 1, a comparative test was carried out to find out whether it was possible to perform high-density recording with only the track pattern being changed to a 10-μm track pattern. The results show that, as shown in FIG. 8, all position adjustable points fall outside an error rate allowable area. Therefore, comparisons could not be made.

This shows that, to increase the recording density by the present mechanical adjustment technology, the present invention is effective because a portion of a track periodically becomes narrow to a value of approximately 5 μm regardless of performing a recording operation at a track pitch of 10 μm.

The adjustable ranges and recording densities (TPI) of the Comparative Examples 1 and 2 and the first and second embodiments described with reference to FIGS. 5 to 8 are summarized in the following Table 3.

TABLE 3

| | COMPARATIVE EXAMPLE 1 | COMPARATIVE EXAMPLE 2 | FIRST EMBODIMENT | SECOND EMBODIMENT |
|---|---|---|---|---|
| ADJUSTABLE RANGE | 35 μm | 0 μm | 50 μm | 50 μm |
| RECORDING DENSITY (TPI) | 1257 | 2540 | 2903 | 2903 |

As shown in Table 3, in the system according to the embodiments of the present invention, although the recording densities are at least two times that of the Comparative Example 1, it is possible to provide wider adjustable ranges. In addition, when, as in the Comparative Example 2, an attempt is made to increase the recording density to a value that is equivalent to the recording densities of the first and second embodiments, an adjustable range itself does not exist, as a result of which the system that is based on Comparative Example 2 cannot be put into practical use.

Specific Examples of Recording Head Blocks

Recording head blocks according to the embodiments of the present invention include m multi-heads having n heads. The number n of heads is at least two, and the number m of multi-heads is at least one.

FIGS. 9 to 13 show structures of recording head blocks and recording tracks. FIG. 9 shows a recording head block in which four 4-channel multi-heads 30 are disposed so as to be shifted from each other by a predetermined distance in a tape longitudinal direction and so that adjacent recording tracks are continuously formed. Each 4-channel multi-head 30 has four recording heads 4 that are shifted from each other in the tape width direction and in the tape longitudinal direction.

Therefore, if the recording head block shown in FIG. 9 is used, recording tracks of 16 channels are formed.

Although final-channel tracks (labeled "Wide" in FIG. 9) of the respective 4-channel multi-heads 30 are wide, the amount by which they are made wide is small (or zero) because, for example, the heads themselves do not move or their positions are easily controlled compared to a helical scanning method.

Types of 4-channel multi-heads include, for example, a standard type (30a) in which only channel 4 is made wide as shown in FIG. 10A, a final recording type (30b) in which all channels have the same width as shown in FIG. 10B, and a both-side wide type (30c) in which channels 1 and 4 are made wide.

Therefore, in the recording head block shown in FIG. 9, the first to third 4-channel multi-heads 30 are the standard type (30a), and only the last (fourth) 4-channel multi-head 30 is the final recording type (30b).

For example, to form recording tracks of 16 channels, as shown in FIG. 11, a recording head block may be formed as a result of combining 4-channel multi-heads 30a, 30b, 30b, and 30c of the three different types shown in FIGS. 10A to 10C.

That is, an 8-channel multi-head 41 is formed as a result of shifting the standard-type 4-channel multi-head 30a and the both-side-wide-type 4-channel multi-head 30c from each other in a same layer in the tape width direction by an amount corresponding to four channels. In addition, an 8-channel multi-head 42 is formed as a result of similarly shifting the final-recording-type 4-channel multi-heads 30b from each other in a same layer in the tape width direction by an amount corresponding to four channels. One 4-channel multi-head 30b is formed as a result of being shifted from the 4-channel multi-head 30a by a predetermined distance in the tape longitudinal direction and by an amount corresponding to four channels in the tape width direction.

Alternatively, as shown in FIG. 12, one recording head block may be formed as a result of forming in the tape width direction two of the recording head blocks shown in FIG. 9 that can form recording tracks of 16 channels. This makes it possible to form recording tracks of 32 channels by one scanning operation.

In FIG. 12, reference numeral 51 denotes an 8-channel multi-head in which the standard-type 4-channel multi-head 30a illustrated in FIG. 10A and the both-side-wide-type 4-channel multi-head 30c illustrated in FIG. 10C are formed so as to be shifted from each other in the same layer in the tape width direction by an amount corresponding to 16 channels.

Reference numeral 52 denotes an 8-channel multi-head in which standard-type 4-channel multi-heads 30a and 30a are formed so as to be shifted from each other in a same layer in the tape width direction by an amount corresponding to 16 channels. One 4-channel multi-head 30a is formed so as to be shifted from the 4-channel multi-head 30a of the multi-head 51 by a predetermined distance in the tape longitudinal direction and by an amount corresponding to four channels in the tape width direction.

Reference numeral 53 denotes an 8-channel multi-head in which standard-type 4-channel multi-heads 30a and 30a are formed so as to be shifted from each other in a same layer in the tape width direction by an amount corresponding to 16 channels. One 4-channel multi-head 30a is formed so as to be shifted from the 4-channel multi-head 30a of the 8-channel multi-head 52 by a predetermined distance in the tape longitudinal direction and by an amount corresponding to four channels in the tape width direction.

Reference numeral 54 denotes an 8-channel multi-head in which final-recording-type 4-channel multi-heads 30b and 30b are formed so as to be shifted from each other in a same layer in the tape width direction by an amount corresponding to 16 channels. One 4-channel multi-head 30b is formed so as to be shifted from the 4-channel multi-head 30a of the 8-channel multi-head 53 by a predetermined distance in the tape longitudinal direction and by an amount corresponding to four channels in the tape width direction.

These four 8-channel multi-heads 51 to 54 constitute the recording head block.

As shown in FIG. 12, since the recording heads 4 and 4 for two channels in the same layer are separated from each other by an amount corresponding to 16 channels, for example, an interval therebetween is at least 80 μm when a track pitch Tp is 5 μm. Therefore, the problem concerning the space occupied by a coil or lead wire of each recording head 4 does not arise.

The recording head block of the embodiment may be formed as a forward-and-reverse-direction recording head as shown in FIG. 13. In FIG. 13, three standard-type 4-channel multi-heads 30a are disposed so as to be shifted from each other in the tape longitudinal direction by a predetermined distance and in the tape width direction so that recording tracks are continuously formed. A fourth 4-channel multi-head 30aa is disposed so as to be shifted in the tape longitudinal direction by a predetermined distance from the third 4-channel multi-head 30a and in the tape width direction so that recording tracks are continuously formed.

The 4-channel multi-head 30aa is one in which the channel 4 track of the standard-type 4-channel multi-head 30a illustrated in FIG. 10A is formed wider (labeled "Very Wide" in FIG. 13).

Reference numeral 60aa denotes a 4-channel multi-head that is formed at a same track location as the first 4-channel multi-head 30a so as to be separated from the first 4-channel multi-head 30a by a predetermined distance in the tape longitudinal direction. In this 4-channel multi-head 60aa, four recording heads 4 are formed so as to be shifted from each other in the tape longitudinal direction by a predetermined distance and in the tape width direction so that recording tracks are continuously formed. In the four recording heads 4, a first channel has a very wide recording track width, and second to fourth channels have a standard recording track width.

Reference numerals 60a each denote a 4-channel multi-head in which four recording heads 4 are formed so as to be shifted from each other in the tape longitudinal direction by a predetermined distance and in the tape width direction so that recording tracks are continuously formed. In the four recording heads 4, a first channel has a wide recording track width and second to fourth channels have a standard recording track width.

The 4-channel multi-heads 60a are formed at the same track locations as the respective second and third 4-channel multi-heads 30a and 30a and fourth 4-channel multi-head 30aa so as to be separated from the respective 4-channel multi-heads 30a, 30a, and 30aa by a predetermined distance in the tape longitudinal direction.

In the three 4-channel multi-heads 30a and the one 4-channel multi-head 30aa, each recording head 4 has a width of, for example, 4 µm, each standard recording track width is 2 µm, each wide recording track width is 3 µm, and the very wide recording track width is 4 µm. They are used when the magnetic tape 14 moves in the direction of illustrated arrow F.

In the one 4-channel multi-head 60aa and the three 4-channel multi-heads 60a, each recording head 4 has a width of, for example, 3 µm, each standard recording track width is 2 µm, each wide recording track width is 2.5 µm, and the very wide recording track width is 3 µm. They are used when the magnetic tape 14 moves in the direction of illustrated arrow R.

Specific Examples of Reproducing Head Blocks

Figure 14:
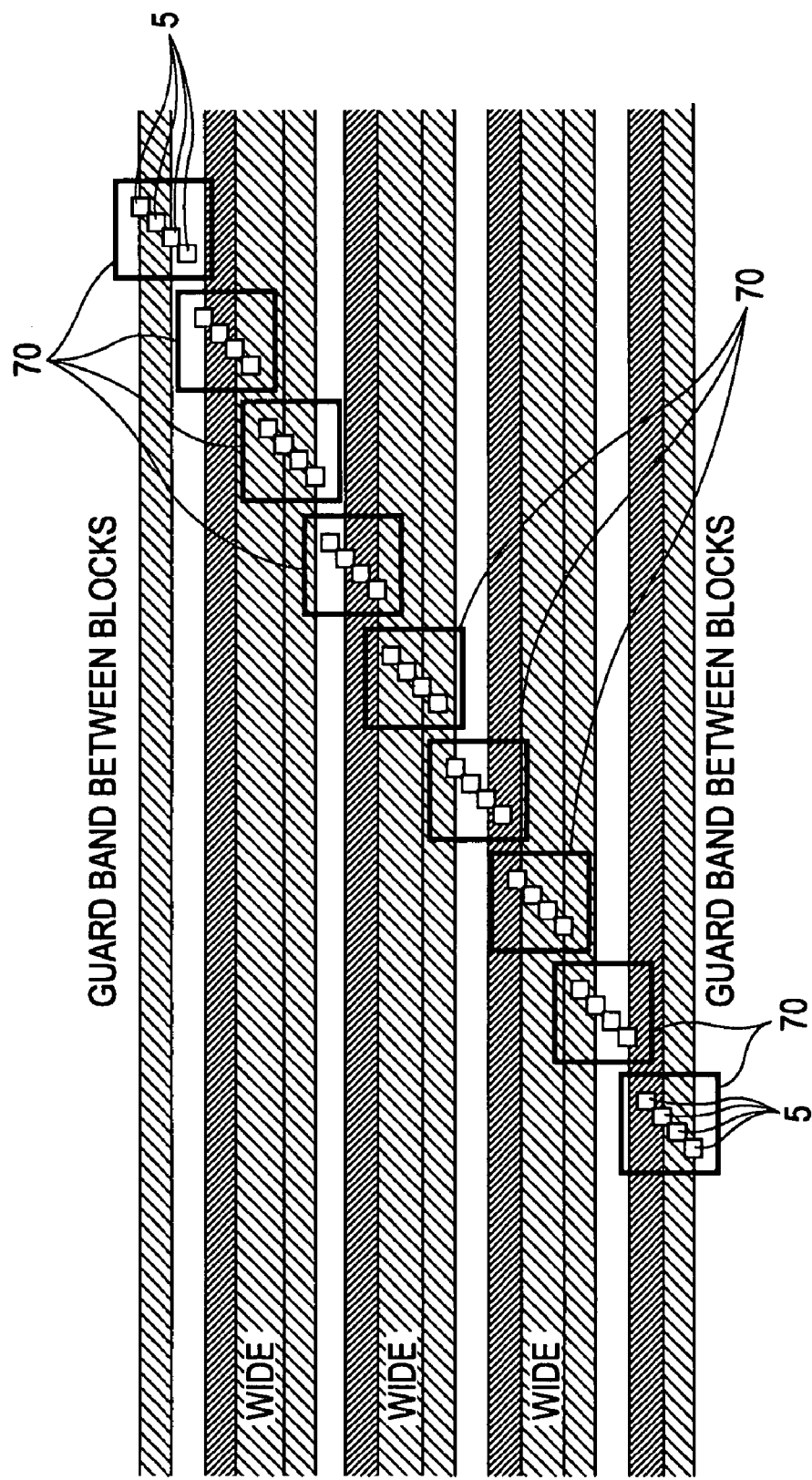
FIG. 14 shows a structure of a specific reproducing head block according to an embodiment of the present invention.
Figure 15:
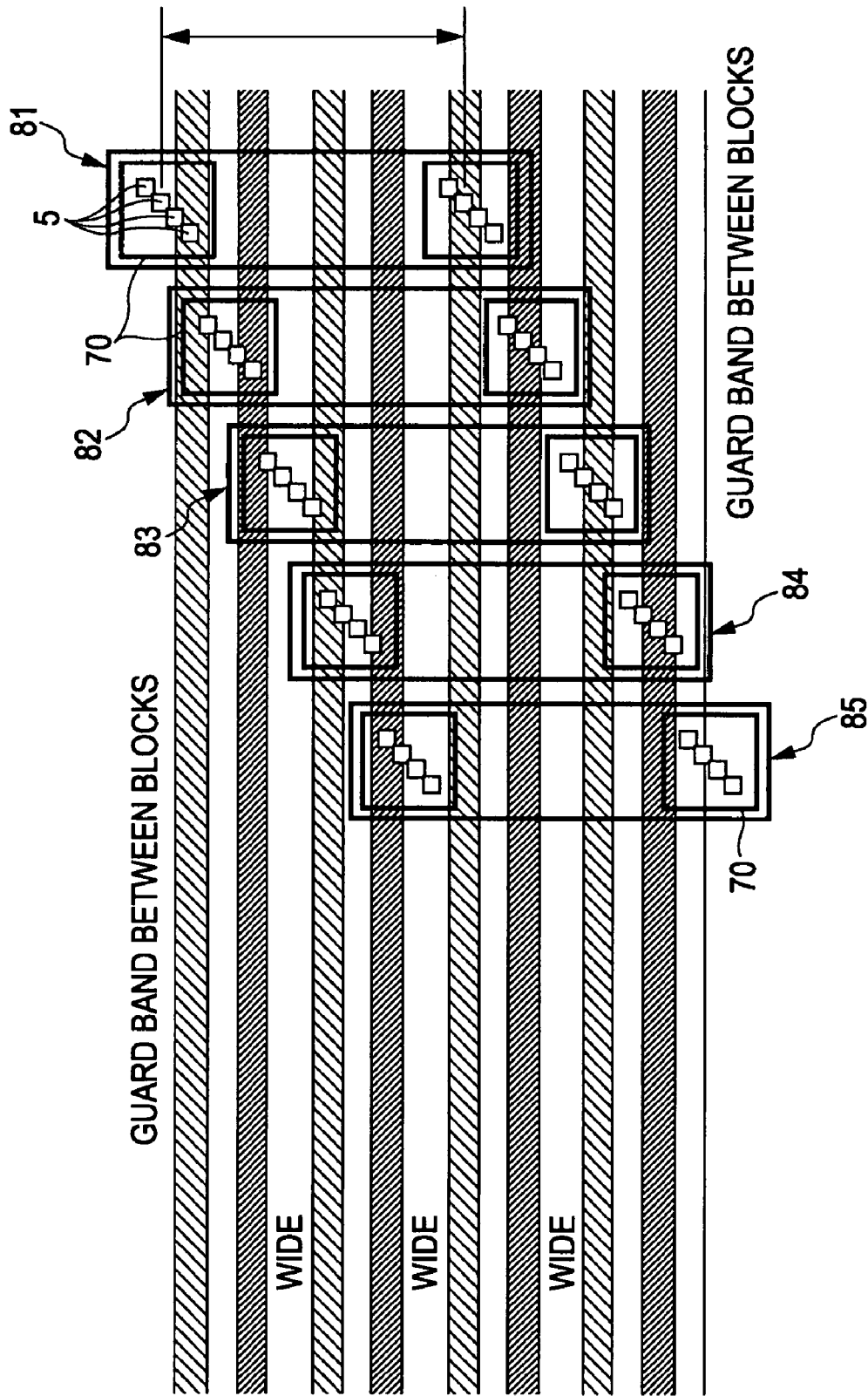
FIG. 15 shows a structure of another specific reproducing head block according to an embodiment of the present invention.
Figure 16:
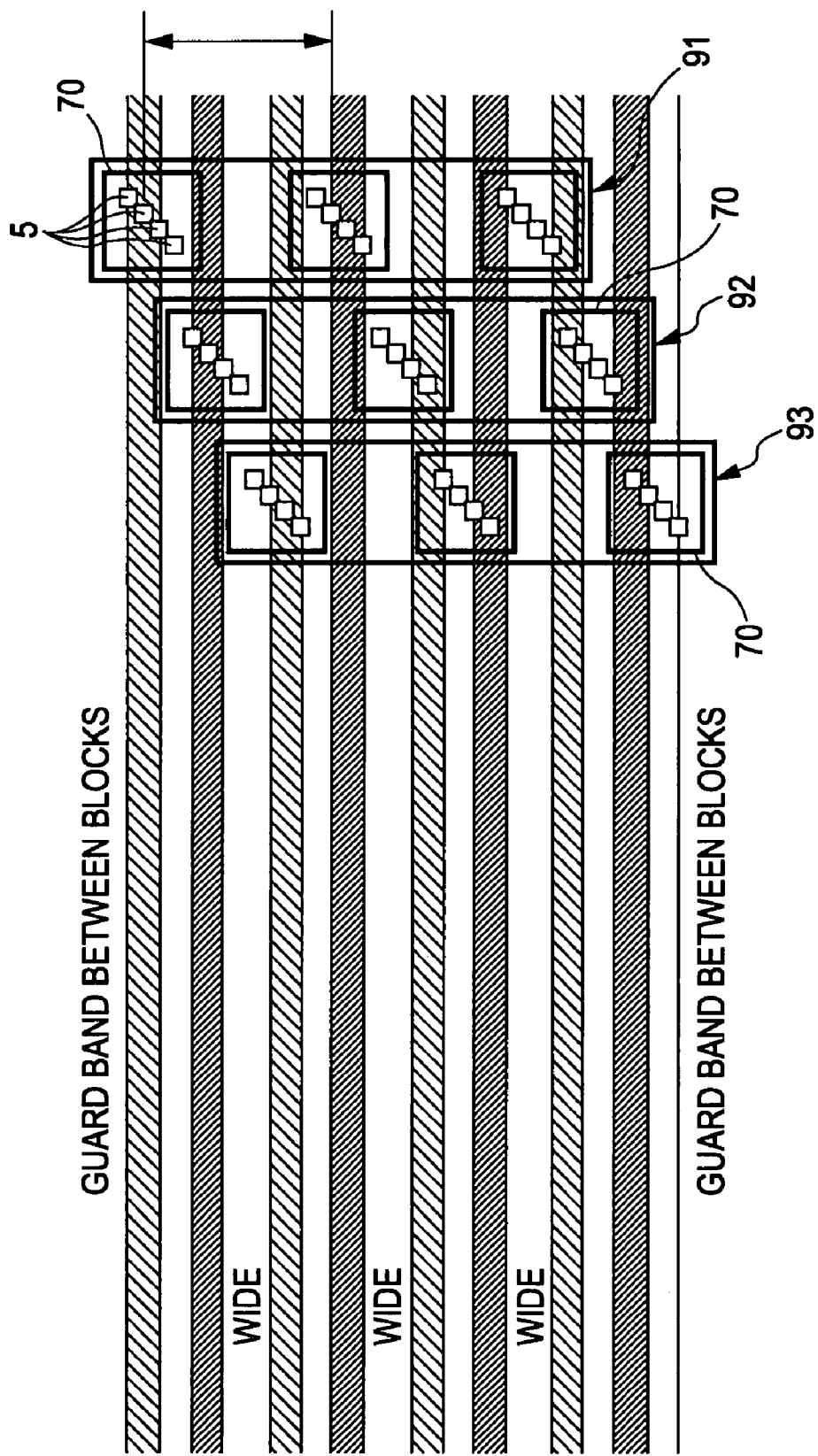
FIG. 16 shows a structure of still another specific reproducing head block according to an embodiment of the present invention.

FIGS. 14 to 16 illustrate structures of reproducing head blocks and recording tracks. The recording tracks are recording tracks of 16 channels illustrated in FIG. 9.

FIG. 14 shows an example of a structure of a reproducing head block in which nine 4-channel multi-heads 70 are disposed so as to be shifted from each other in a tape longitudinal direction by a predetermined distance and in the tape width direction in order to be successively adjacent to each other. In addition, the 4-channel multi-heads 70 are disposed so as to be shifted within a width that is larger than a recording track width of 16 channels. Each 4-channel multi-head 70 has four reproducing heads 5 that are shifted from each other in the tape width direction and in the tape longitudinal direction.

In the embodiment shown in FIG. 14, the reproducing heads 5 for 36 channels are disposed with respect to recording tracks of 16 channels. This is because, considering, for example, errors in wide tracks, errors in the recording tracks, and errors in the reproducing heads, if eight 4-channel multi-heads 70 and reproducing heads 5 for 32 channels are disposed within a range having a width that is equal to the recording-track width of 16 channels, reproduction outputs from all tracks may not be provided.

Therefore, more than eight 4-channel multi-heads 70 are disposed so that some of them extend beyond the recording track width of 16 channels and so that tape-width-direction intervals between the 4-channel multi-heads 70 overlap each other.

FIG. 15 shows an embodiment in which reproducing heads 5 for 40 channels are disposed with respect to recording tracks of 16 channels. Reference numeral 81 in FIG. 15 denotes an 8-channel multi-head in which 4-channel multi-heads 70, like the 4-channel multi-heads 70 illustrated in FIG. 14, are formed so as to be shifted from each other in a same layer by a distance corresponding to five times a tape-width-direction size of the 4-channel multi-head 70.

In addition, 8-channel multi-heads 82 to 85, which are formed similarly to the 8-channel multi-head 81, are disposed so as to be separated from the 8-channel multi-head 81 in the tape longitudinal direction by a predetermined distance and so as to be shifted downward in the tape width direction by an amount corresponding to the tape-width-direction size of the 4-channel multi-head 70.

No problems arise as regards the reproducing heads 5 even if the pitch between a plurality of channels in the same layer is smaller than that for the recording heads 4. In the case shown in FIG. 15, the interval between two 4-channel multi-heads 70 of the same 8-channel multi-head is 50 µm if a basic track pitch is 5 µm.

FIG. 16 shows an embodiment in which reproducing heads 5 for 36 channels are disposed with respect to recording tracks of 16 channels as a result of using three 12-channel multi-heads. Reference numeral 91 in FIG. 16 denotes a 12-channel multi-head in which three 4-channel multi-heads 70, like the 4-channel multi-heads 70 illustrated in FIG. 14, are formed so as to be shifted from each other in a same layer by a distance corresponding to three times a tape-width-direction size of the 4-channel multi-head 70.

In addition, 12-channel multi-heads 92 and 93, which are formed similarly to the 12-channel multi-head 91, are disposed so as to be separated from the 12-channel multi-head 91 in the tape longitudinal direction by a predetermined distance and so as to be shifted downward in the tape width direction by an amount corresponding to the tape-width-direction size of the 4-channel multi-head 70.

In the case shown in FIG. 16, the intervals between the three 4-channel multi-heads 70 of the same 12-channel multi-head is 25 µm if a basic track pitch is 5 µm.

Accordingly, by making short the distance between the 4-channel multi-heads 70 in the same layer, it is possible to considerably reduce the tape longitudinal size of the reproducing head block.

Accordingly, the magnetic recording head device and the magnetic recording/reproducing apparatus that record a signal onto and reproduce the signal from a magnetic tape using a linear serpentine system and that use the non-tracking method for a reproducing operation are constructed such that a magnetic head system has the following features. In the magnetic head system, inductive heads are used as recording heads used to form a plurality of tracks, and the width of a final head among the plurality of recording heads is larger than the width of a preceding head, in which case the head feeding amount is equal to substantially the total head width. Alternatively, in the magnetic head system, inductive heads are used as recording heads used to form a plurality of tracks, and the head feeding amount is larger than the total head width though the widths of the plurality of recording heads are substantially the same. Therefore, even if adjustments are made with a mechanical positioning precision that is the same as that of a related art, the precision of magnetic recording can be increased, so that the invention contributes to achieving higher density recording.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic head device that performs a recording operation and a reproducing operation in a linear magnetic tape recording system having a plurality of tracks that are formed parallel to each other in a longitudinal direction of a tape, the magnetic head device comprising:
   a recording head block including a plurality of recording heads that are disposed in correspondence with respective tracks in a first area including the tracks that are adjacent to each other,
   wherein the recording operation is performed on the tracks that are adjacent to each other at the same time with the recording head block.

2. The magnetic head device according to claim 1, further comprising a reproducing head block including a plurality of reproducing heads disposed in correspondence with tracks in a second area that is wider than the first area in a track width direction, more than one of the plurality of reproducing heads being disposed in correspondence with the corresponding one of the tracks.

3. A magnetic recording/reproducing apparatus that performs a recording operation and a reproducing operation in a linear magnetic tape recording system having a plurality of tracks that are formed parallel to each other in a longitudinal direction of a tape, the magnetic recording/reproducing apparatus comprising:

a recording head block including a plurality of recording heads that are disposed in correspondence with respective tracks in a first area including the tracks that are adjacent to each other, wherein the recording operation is performed on the tracks that are adjacent to each other at the same time with the recording head block.

4. The magnetic recording/reproducing apparatus according to claim 3, further comprising a reproducing head block including a plurality of reproducing heads disposed in correspondence with tracks in a second area that is wider than the first area in a track width direction, more than one of the plurality of reproducing heads being disposed in correspondence with the corresponding one of the tracks, wherein the reproducing operation is performed by a non-tracking method.

* * * * *